(12) United States Patent
Moriya

(10) Patent No.: US 7,541,072 B2
(45) Date of Patent: Jun. 2, 2009

(54) LIQUID CRYSTAL ELECTRO-OPTICAL DEVICE

(75) Inventor: Koji Moriya, Kanagawa (JP)

(73) Assignee: Semiconductor Energy Laboratory Co., Ltd., Kanagawa-Ken (JP)

( * ) Notice: Subject to any disclaimer, the term of this patent is extended or adjusted under 35 U.S.C. 154(b) by 622 days.

(21) Appl. No.: 11/281,563

(22) Filed: Nov. 18, 2005

(65) Prior Publication Data

US 2006/0110550 A1    May 25, 2006

(30) Foreign Application Priority Data

Nov. 22, 2004  (JP) .............................. 2004-337397

(51) Int. Cl.
*C09K 19/00* (2006.01)
*C09K 19/06* (2006.01)
*C09K 19/52* (2006.01)

(52) U.S. Cl. ..................... 428/1.1; 430/20; 252/299.01; 252/299.6; 349/117

(58) Field of Classification Search ............ 252/299.01, 252/299.6; 430/20, 270.1; 428/1.1; 349/117
See application file for complete search history.

(56) References Cited

U.S. PATENT DOCUMENTS

| | | | |
|---|---|---|---|
| 4,882,083 A | 11/1989 | Terashima et al. | |
| 5,495,355 A | 2/1996 | Konuma | |
| 5,534,190 A | 7/1996 | Johno et al. | |
| 5,790,217 A | 8/1998 | Lee et al. | |
| 6,015,507 A * | 1/2000 | Kobayashi et al. | ..... 252/299.01 |

FOREIGN PATENT DOCUMENTS

| | | |
|---|---|---|
| JP | 63-186217 | 8/1988 |
| JP | 06-281963 | 10/1994 |
| JP | 3202404 | 6/2001 |

* cited by examiner

*Primary Examiner*—Geraldina Visconti
(74) *Attorney, Agent, or Firm*—Nixon Peabody LLP; Jeffrey L. Costellia

(57) ABSTRACT

The present invention provides a liquid crystal electro-optical device that response time is short and voltage holding rate is not lowered. One feature of the invention is a first substrate, a first electrode over the first substrate, a first orientation film covering the first electrode, and a second substrate opposed to the first substrate and provided with a second electrode, a second orientation film covering the second electrode, a liquid crystal layer interposed between the first and the second substrates, wherein the liquid crystal layer is formed of a mixture of a nematic liquid crystal and a liquid crystal having a smectic phase, wherein a ratio of a liquid crystal having a smectic phase in the mixture is 20 weight % or less, and wherein an arithmetic average of rise response time and fall response time of a plurality of liquid crystal molecules in the mixture is 8 msec or less.

40 Claims, 23 Drawing Sheets

LIQUID CRYSTAL ELECTRO-OPTICAL DEVICE

BACKGROUND OF THE INVENTION

1. Field of the Invention

The present invention relates to a liquid crystal electro-optical device which has a liquid crystal layer composed of a mixture of a nematic liquid crystal material and a liquid crystal material having a smectic phase and which operates, for example, by a twisted nematic mode.

2. Description of the Related Art

Nowadays, a liquid crystal electro-optical device is used in a wide range of fields such as an office automation equipment such as a word processor or a laptop computer, a liquid crystal television, a PDA, a mobile phone as well as a clock or a calculator.

The mode generally used for this liquid crystal electro-optical device is a twisted nematic mode (hereinafter, referred to as TN mode in this specification) in which rubbing treatment is conducted to an orientation film provided for an upper substrate and a lower substrate and rubbing directions of the upper substrate and the lower substrate are shifted by 90° to each other. In case of a TN mode, when an electric field is applied to a liquid crystal from a pair of electrodes, a major axis of the liquid crystal is oriented so as to be perpendicular to the substrate by an interaction of an electric field and dielectric anisotropy. A polarizing plate is used to distinguish a state of a liquid crystal molecule when voltage is not applied to a liquid crystal (twist) from a state when voltage is applied to the liquid crystal.

In a liquid crystal electro-optical device using a nematic liquid crystal which is widely used for a liquid crystal electro-optical device and using a TN mode, for example, response time (sum of rise response time and fall response time) which is mentioned in Patent Document 1 (Patent Document 1: Japanese Patent Laid-Open No. H6-281963) is 20 msec or more. However, in the case of displaying a moving image or the case of employing a field sequential method, this response time is not enough and a liquid crystal material which can conduct further fast response is required.

In the case of displaying a moving image by a liquid crystal television or the like or the case of employing a field sequential method in an operation mode, there is a problem of influencing on visual quality, for example, contrast is lowered or afterimage is generated since response of a liquid crystal does not catch up if response time of a liquid crystal is 20 msec or more in driving a liquid crystal by a TN mode using a nematic liquid crystal material. Although response time of a liquid crystal can be shortened by narrowing a cell gap, there is a limitation on narrowing a cell gap. The term "cell gap" means a thickness of a liquid crystal layer held between two substrates or a distance between the two substrates.

SUMMARY OF THE INVENTION

One feature of the present invention is a liquid crystal electro-optical device having an electrode and an orientation film in each of a pair of substrates and having a liquid crystal layer between the pair of substrates provided with the electrode and the orientation film, in which a cell gap has a predetermined size, wherein a liquid crystal material used for the liquid crystal layer is a mixture of a nematic liquid crystal and a liquid crystal having a smectic phase, and a ratio of the liquid crystal having a smectic phase in the mixture is 20 weight % or less. Accordingly, response time of a liquid crystal can be shortened more than a conventional response time and an arithmetic average of rise response time and fall response time is 8 msec or less, and the above-described problem can be solved.

By using the invention, response time in the case of driving a liquid crystal by a TN mode can be shortened, and the reduction of afterimage in a display and the enhancement of contrast can be attempted; therefore, the invention is suitable for moving image display or a field sequential method.

The decrease of voltage holding rate is rarely observed even if a mixture of a nematic liquid crystal and a liquid crystal having a smectic phase; accordingly, flicker or the like of a screen in a display is not required to be concerned.

A phase transition temperature from an isotropic phase in a mixture becomes higher than a transition temperature from an isotropic phase to a nematic phase of a nematic liquid crystal (hereinafter, referred to as I-N transition temperature in this specification) by mixing a liquid crystal having a smectic phase that a transition temperature from an isotropic phase is high. Therefore, an operating temperature range can be widened.

These and other objects, features, and advantages of the present invention will become more apparent upon reading of the following detailed description along with the accompanied drawings.

DETAILED DESCRIPTION OF THE INVENTION

EMBODIMENT MODE 1

Figure 1:
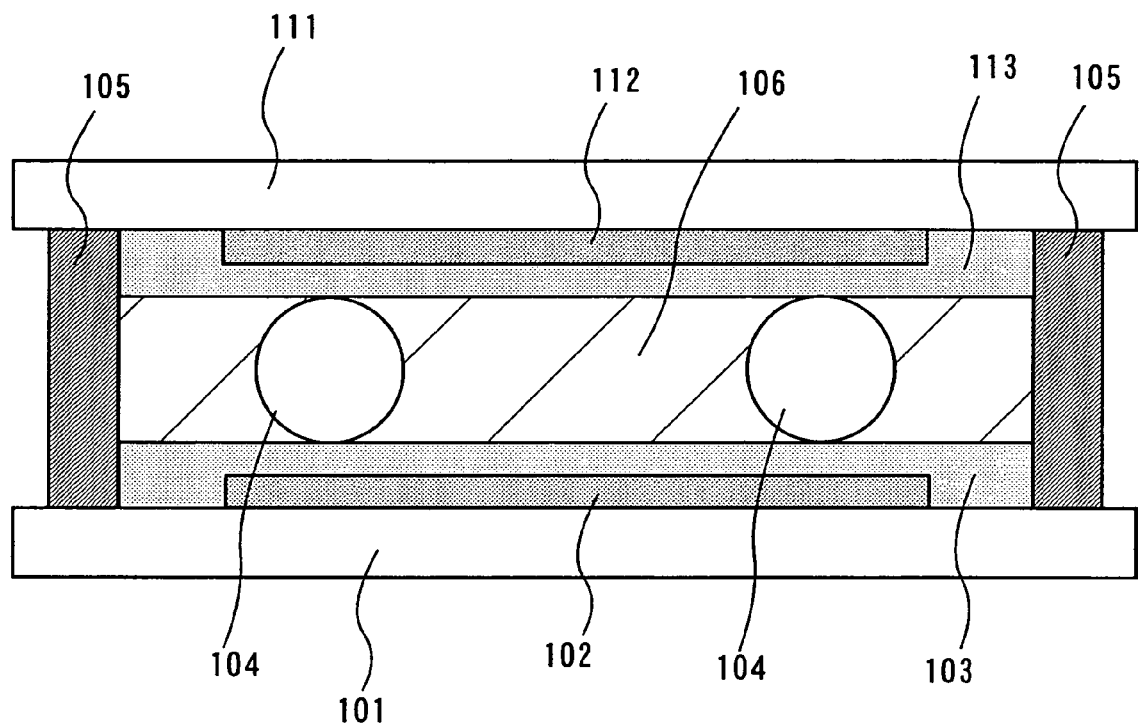
FIG. 1 is a schematic view of a TN mode liquid crystal electro-optical device.

Hereinafter, a method for manufacturing a liquid crystal electro-optical device that a schematic view is shown in FIG. 1 is explained.

Two substrates having a light-transmitting property such as a glass substrate, a plastic substrate, or a film-like substrate are prepared, and an electrode is formed over each of the substrates 101 and 111 by a sputtering method or a vapor deposition method. A transparent conductive film such as indium tin oxide (ITO), tin oxide, zinc oxide, indium tin oxide containing silicon oxide, indium zinc oxide (IZO), or the like is used for the electrode to be formed.

Next, a resist pattern is formed over the transparent conductive film in a photolithography step by, for example, the following method: The transparent conductive film is coated with a resist resin (ultraviolet photosensitive resin) by a spin coating method. Then, baking is conducted and light-exposure is conducted by a proximity exposure machine, lens projection exposure machine, or mirror projection exposure machine using a mask which is for forming an electrode. And then, development is conducted using alkaline developer. As the alkaline developer, organic alkali such as trimethylammonium hydride or tetramethylammonium hydroxide, or sodium carbonate can be used. Finally, the alkaline developer is removed by cleaning with running water.

Then, etching is conducted to a portion which is not covered with the resist pattern of the transparent conductive film described above by etchant. For example, water solution of hydrochloric acid, water solution of hydrochloric acid and nitric acid, or water solution of ferric chloride and hydrochloric acid is used as the etchant. In etching, reactivity may be enhanced by heating according to need. In addition, a chemical dry etching using gas plasma may be used.

After the etching, the resist is peeled by a peeling solution using a strong alkali ion. Then, baking is preferably conducted by an oven to heighten transmittance and lower resistivity of the transparent conductive film. Thus, a predetermined pattern of electrodes 102 and 112 formed of the transparent conductive film is formed. A predetermined pattern of the electrodes 102 and 112 may be directly formed by a printing method such as a screen printing method using a liquid or a paste containing a material which constitutes a part of the transparent conductive film without forming the resist pattern nor etching. The electrodes 102 and 112 are formed by baking the printed pattern at 200° C. to 300° C.

Next, after cleaning the substrate 101 provided with the electrode 102 and the substrate 111 provided with the electrode 112, an orientation film 103 is formed over the substrate 101 so as to cover the electrode 102, and an orientation film 113 is formed over the substrate 111 so as to cover the electrode 112. To form the orientation films 103 and 113, printing by offset printing or the like or spin-coating by a spinner is conducted to, for example, a polyimide resin in which polyamic acid is dissolved in a solvent mixing N-methyl-2-pyrrolidone or the like and cellosolve acetate or the like, or a polyimide resin (SE7792 manufactured by Nissan Chemical Industries, Ltd.) in which polyamic acid is imidized and dissolved in a solvent so as to have a film thickness of, for example, 40 nm or more to 50 nm or less, then baking is conducted by a clean oven. Orientation treatment is conducted to the surfaces of the orientation films 103 and 113 formed as described above into a predetermined direction by a rubbing method for rubbing by a rubbing cloth such as felt or cotton, then cleaning is conducted.

When the material of the orientation films 103 and 113 is selected, a material that a pretilt angle of 1° or more to 9° or less, for example, 6° or more to 7° or less is expressed in a liquid crystal mole cule by a normal rubbing method is selected.

Next, a seal pattern is formed over one of the substrates 101 and 111 so as to be outside the electrode 102 or the electrode 112 formed over one of the substrates 101 and 111 using a seal material 105 mixed with a cylindrical or spherical gap holding material at a predetermined rate, for example at 1.5 weight %, by a dispenser or screen printing. It is preferable that the gap holding material contains $SiO_2$ as its main component, and for example, the gap holding material having a diameter of 2.2 μm can be used. As the seal material 105, a thermosetting resin such as an epoxy resin, a phenol resin, or an acrylic resin, or an ultraviolet curing resin can be used.

Then, an interstitial material (spacer) 104 having a diameter which is smaller than that of the gap holding material, for example having a diameter of 2 μm, is mixed into a solvent containing alcohol as its main component, for example isopropyl alcohol, to be dispersed by applying an ultrasonic wave. The solvent may be a mixed solvent containing water and alcohol as its main components. The interstitial material (spacer) 104 is sprayed by a spinner over the other substrate which is not provided with the seal pattern using the solvent into which the interstitial material (spacer) 104 is dispersed. The interstitial material (spacer) 104 may be a spacer containing $SiO_2$ as its main component (glass spacer) or a resin spacer (plastic bead spacer) may be used as long as the spacer has a spherical shape. The spraying is not limited to the wet type spraying, and dry type spraying by which a powder spacer is sprayed over a substrate by air flow such as dry air or pressed dry nitrogen may be used.

One of the substrates 101 and 111 to which the seal pattern is formed is pasted to the other substrate to which the spacer is sprayed. For example, the pasting is conducted so that the directions of rubbing conducted to each of the orientation films 103 and 113 are shifted by 90° to each other to pressing thermally by a clean oven with applying press by a burning tool of a liquid crystal panel seal. Alternatively, thermal pressing is conducted with applying press above a hot plate. The substrate after the thermal pressing is divided into panels having a predetermined size by a scriber so that the electrode can be taken out.

Next, a nematic liquid crystal and a liquid crystal having a smectic phase are each weighed by an electronic balance so that a ratio of a liquid crystal having a smectic phase does not exceed 20 weight % to mix with each other. If a ratio of a liquid crystal having a smectic phase exceeds 20 weight %, a ferroelectric electro-optical effect increases.

As the liquid crystal having a smectic phase, a monostable ferroelectric liquid crystal or a bistable ferroelectric liquid crystal can be used, and a liquid crystal which conducts phase transition in the order of an isotropic phase, a smectic C phase, and a crystal, or a liquid crystal which conducts phase transition in the order of an isotropic phase, a nematic phase, a smectic A phase, a smectic C phase, and a crystal can be used.

As the nematic liquid crystal, a liquid crystal in which dielectric anisotropy $\Delta\epsilon$ shows a positive value, especially a liquid crystal in which $\Delta\epsilon$ shows 5 or more to 10 or less at 20° C., can be used, and a cyano-based liquid crystal having a cyano group or a fluorine-based liquid crystal having a bond of carbon-fluorine can be used. In addition, a liquid crystal added with a chiral agent can be used. The value of dielectric anisotropy $\Delta\epsilon$ influences rise response time. Disclination can be suppressed by adding a chiral agent to the nematic liquid crystal.

The mixed liquid crystal is stirred for a predetermined period, for example one hour, by a stirrer while heat is applied at, for example, 100° C. above a data plate. Temperature at stirring may be any of an I-N transition temperature of a nematic liquid crystal or a phase transition temperature from an isotropic phase of a liquid crystal having a smectic phase, which is higher than the other transition temperature. By stirring at the phase transition temperature or more, the nematic liquid crystal and the liquid crystal having a smectic phase are mixed with each other, and are not separated from each other after the stirring.

A mixture of the nematic liquid crystal and the liquid crystal having a smectic phase is injected into the panel above a hot plate at a predetermined temperature, for example 100° C., utilizing capillary phenomenon. The injection may be conducted by a vacuum injection method. When an oriented state after the injection is seen by interposing the mixture between polarizing plates above a backlight, the liquid crystals are not separated from each other. A liquid crystal layer 106 using the above mixture is shown in FIG. 1.

The following method may be used: after spraying an interstitial material (spacer) 104 to one of the substrates 101 and 111 that the above-described orientation treatment (rubbing) is completed and after forming a seal pattern formed from the seal material 105, a mixture of a nematic liquid crystal and a liquid crystal having a smectic phase is dropped to a region surrounded by the seal pattern, then one of the substrate 101 and 111 is pasted to the other substrate. In addition, a columnar interstitial material (spacer) may be provided by forming a columnar pattern formed from an insulating material over one of the substrate 101 and 111 instead of spraying a spherical interstitial material (spacer) 104 as described above.

When the cell gap of the liquid crystal electro-optical device manufactured as described above is measured, the cell gap is in the range of 2.0 µm or more to 2.5 µm or less.

In the case of using the mixture of the nematic liquid crystal and the liquid crystal having a smectic phase, in which a ratio of the liquid crystal having a smectic phase is at 20 weight % or less, the manufactured liquid crystal electro-optical device can shorten both rise response time and arithmetic average of rise response time and fall response time. In the case of using the mixture in which a ratio of the liquid crystal having a smectic phase is at 20 weight % or less, both rise response time and arithmetic average of rise response time and fall response time can be shortened, and further, an image displayed on the liquid crystal electro-optical device can be obtained with high contrast by using a specific nematic liquid crystal, namely a liquid crystal in which a product of a cell gap and the refractive index anisotropy $\Delta n$ of the nematic liquid crystal is in the range of 0.27 µm or more to 0.34 µm or less.

The term "rise response time" means time of switching lightning by arranging long axes of a plurality of liquid crystal molecules in a perpendicular direction to the surface of a substrate from a state of being continuously twisted between two substrates. Alternatively, the term "fall response time" means time of switching lightning by returning long axes of a plurality of liquid crystal molecules to a state of being continuously twisted between two substrates from a state of being arranged in a perpendicular direction to the surface of the substrate.

By mixing a nematic liquid crystal with a liquid crystal having a smectic phase which shows a phase transition temperature from an isotropic phase which is higher than the I-N transition temperature, the phase transition temperature from an isotropic phase of a mixture can be more heightened than the I-N transition temperature of the nematic liquid crystal.

EMBODIMENT MODE 2

As for a liquid crystal electro-optical device using a mixture of a nematic liquid crystal and a liquid crystal having a smectic phase manufactured according to Embodiment Mode 1, rise response time and fall response time are measured and voltage holding rate is obtained. Further, as for the mixture, a temperature at which phase transition is conducted from an isotropic phase in case of cooling after obtaining an isotropic phase by heating is measured.

A method for measuring response time is illustrated. A panel having a liquid crystal layer filled with a mixture of a nematic liquid crystal and a liquid crystal having a smectic phase is connected to a lead wire. Two polarizing plates are arranged in crossed nicols and the panel is arranged between the two polarizing plates by using a polarizing microscope. Response time of a liquid crystal is observed using an oscilloscope by applying voltage to the lead wire. Voltage having a rectangular wave of 0 V to 10 V and frequency of 1 Hz is applied using a waveform generator (power supply). A waveform (pulse) outputted to the oscilloscope shows a change of intensity of light transmitted through the liquid crystal layer with respect to time. The larger amplitude of the waveform (pulse), the higher the contrast of an image displayed on a liquid crystal electro-optical device.

A method for obtaining voltage holding rate is illustrated. Pulse of 64 µsec at 10 V is applied to a panel filled with a mixture of a nematic liquid crystal and a liquid crystal having a smectic phase per 30 msec using a field effect transistor, and the lowering rate of an electric potential of the liquid crystal electro-optical device at the time is obtained from an effective value, which is voltage holding rate. An object of measuring voltage holding rate is to investigate deterioration of a liquid crystal due to mixing a nematic liquid crystal with a liquid crystal having a smectic phase.

Figure 2:
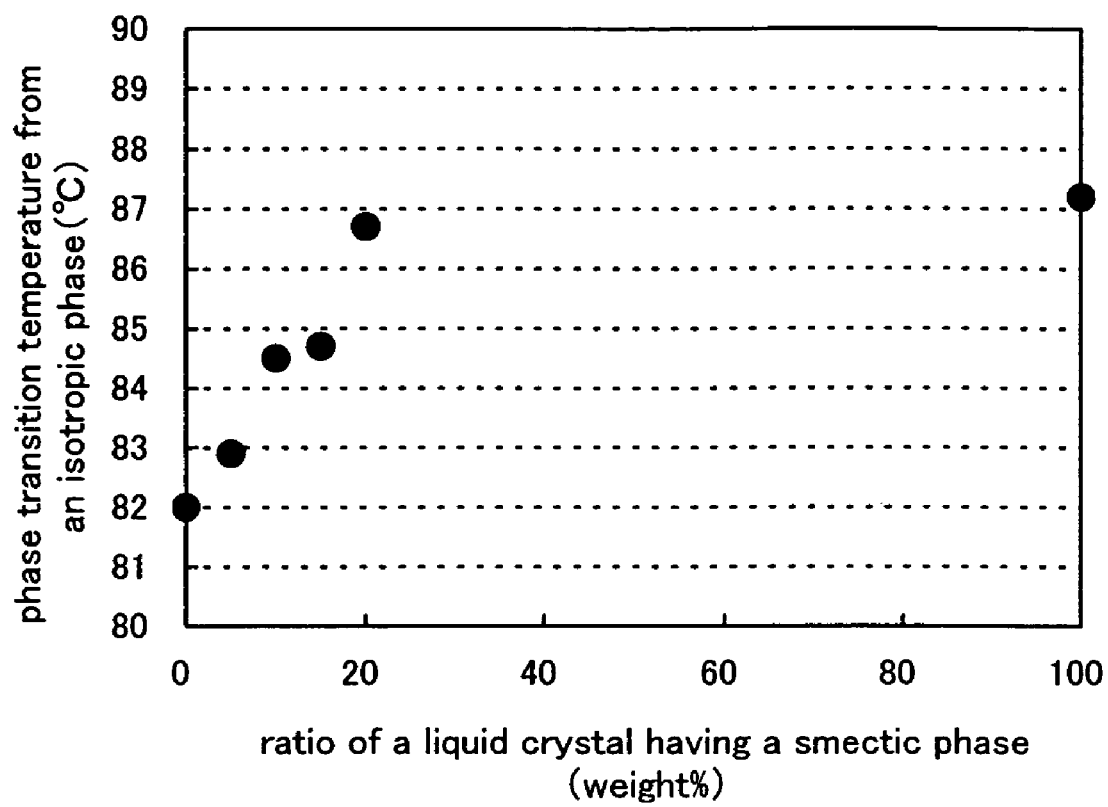
FIG. 2 is a view showing a change of a phase transition temperature from an isotropic phase in Embodiment Mode 2.
Figure 3:
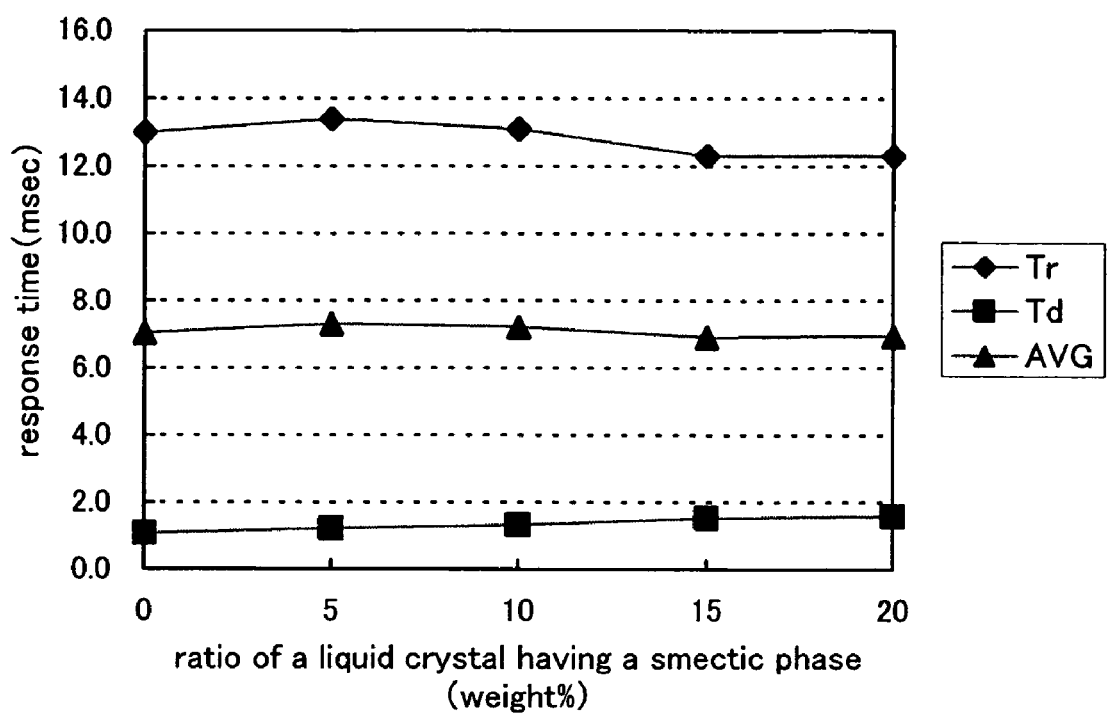
FIG. 3 is a view showing a change of response time in Embodiment Mode 2.
Figure 4:
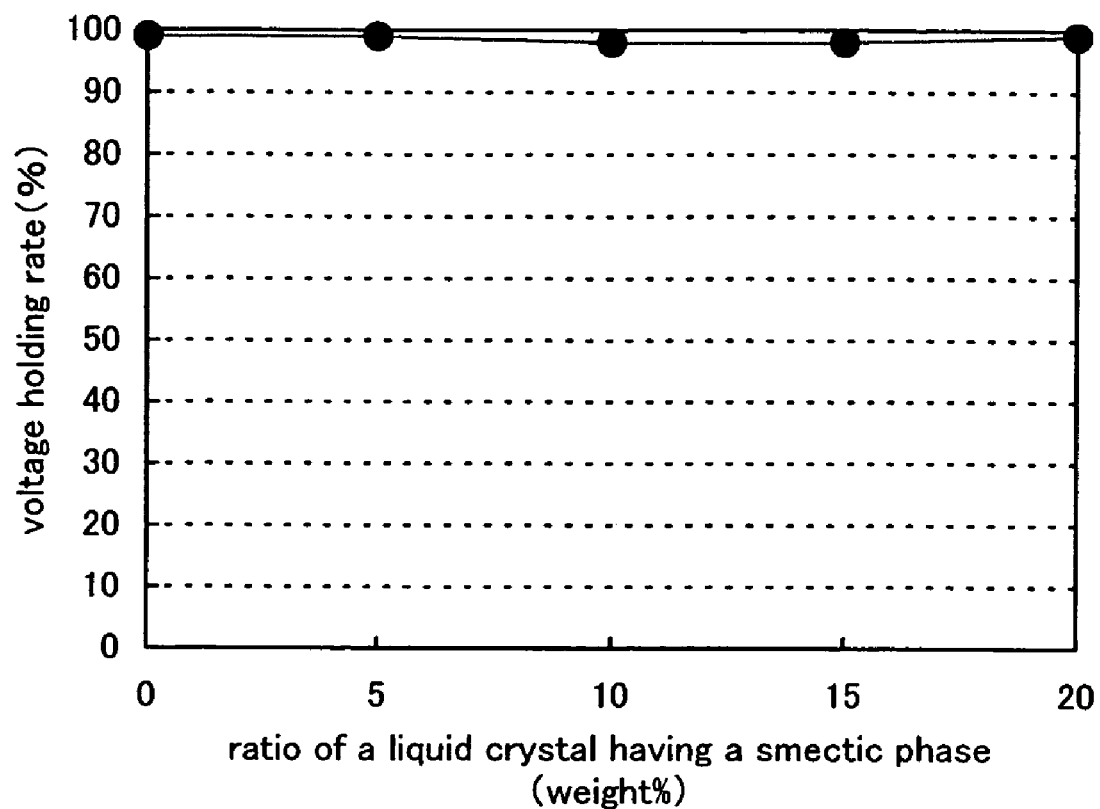
FIG. 4 is a view showing a change of voltage holding rate in Embodiment Mode 2.

In the case of using TL215 manufactured by Merck as a nematic liquid crystal and R2401 manufactured by Clariant as a liquid crystal having a smectic phase, FIG. 2 shows a result of measuring a phase transition temperature from an isotropic phase, FIG. 3 shows a result of measuring rise response time (Tr) and fall response time (Td) and obtaining arithmetic average (AVG) of the rise response time (Tr) and the fall response time (Td), and FIG. 4 shows a result of obtaining voltage holding rate.

TL215 manufactured by Merck is a fluorine-based liquid crystal, which is a nematic phase at 20° C. and an isotropic phase at a temperature which exceeds an I-N transition temperature. Dielectric anisotropy $\Delta\epsilon$ is 8.5 at 20° C., refractive index anisotropy $\Delta n$ is 0.2042 at 20° C. in the case of using light of 589 nm, and viscosity is 44 $mm^2s^{-1}$ at 20° C. R2401 manufactured by Clariant is a monostable ferroelectric liquid crystal, which conducts phase transition in the order of an isotropic phase, a smectic C phase, and a crystal and is a smectic C phase at 20° C.

Within a range in which a ratio of a liquid crystal R2401 having a smectic phase is 20 weight % or less, it is confirmed that a phase transition temperature from an isotropic phase rises by weight or less when a ratio of a liquid crystal R2401 having a smectic phase in the mixture increases compared with a case of using only a nematic liquid crystal TL215. This is because a liquid crystal that a transition temperature from an isotropic phase is higher influences as can be seen from the result that an I-N transition temperature of a nematic liquid crystal TL215 is 82° C. and a transition temperature of a liquid crystal R2401 having a smectic phase from an isotropic phase to a smectic C phase is 87.2° C.

In the case of using a mixture in which a ratio of a liquid crystal R2401 having a smectic phase is 15 weight % and 20 weight %, each of which is 20 weight % or less, it is confirmed that rise response time is 12.3 msec, which is shorter than 13 msec, and arithmetic average of rise response time and fall response time has a tendency to be shorter than 7 msec, which is approximately 6.9 msec. Fall response time has not exceeded 2 msec.

In the case of using a mixture in which a ratio of a liquid crystal R2401 having a smectic phase is 20 weight % or less, it is confirmed that voltage holding rate is 98% to 99%, which is little changed, although a ratio of a liquid crystal R2401 having a smectic phase in the mixture increases, while voltage holding rate in the case of using only a nematic liquid crystal TL215 is 99%.

EMBODIMENT MODE 3

Figure 5:
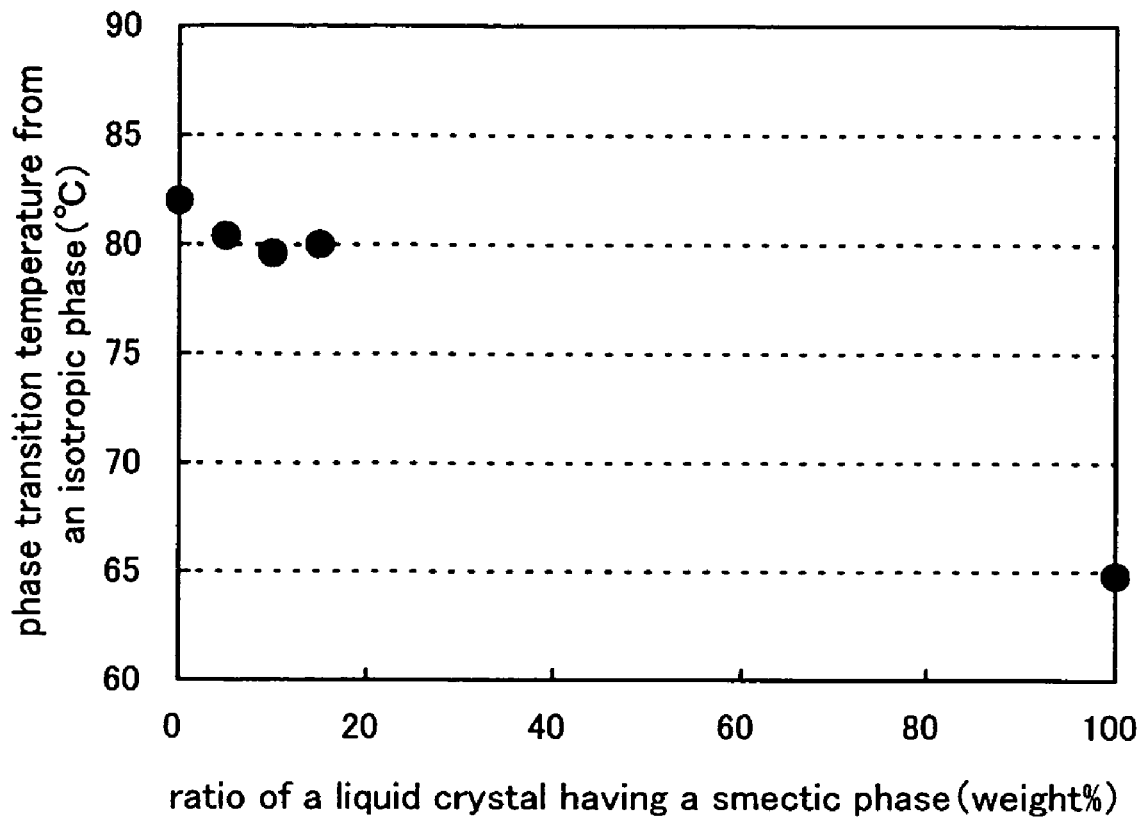
FIG. 5 is a view showing a change of a phase transition temperature from an isotropic phase in Embodiment Mode 3.
Figure 6:
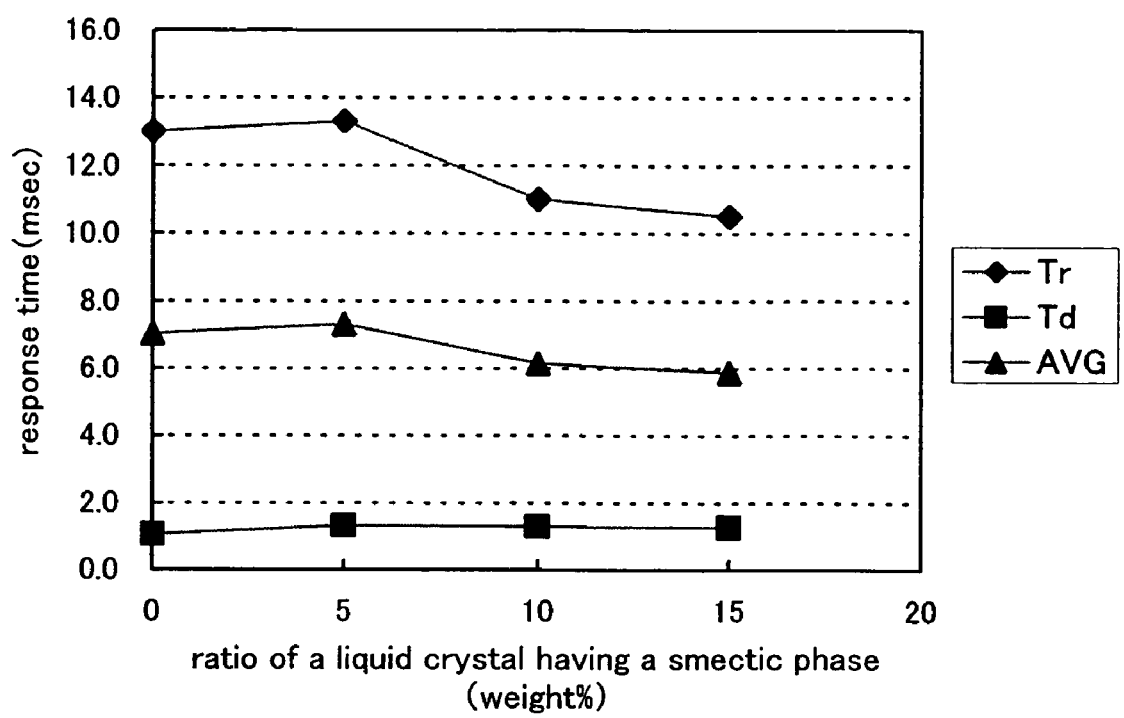
FIG. 6 is a view showing a change of response time in Embodiment Mode 3.
Figure 7:
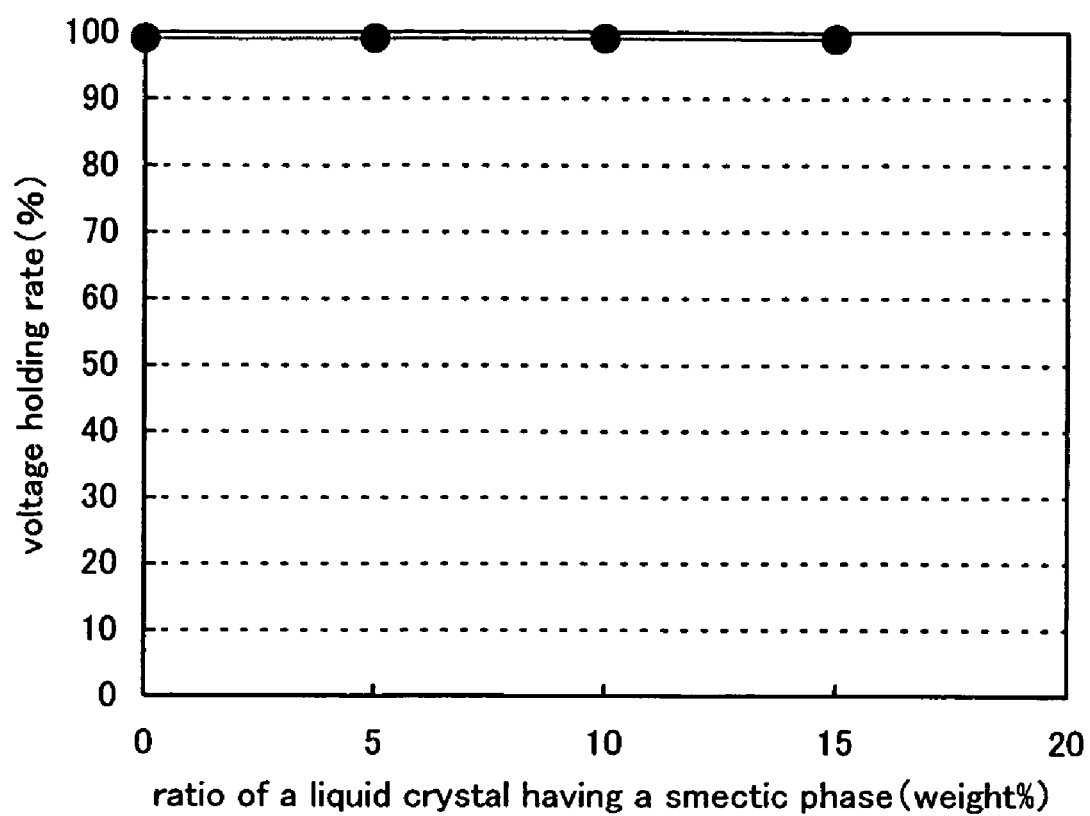
FIG. 7 is a view showing a change of voltage holding rate in Embodiment Mode 3.

As for the case where TL215 manufactured by Merck which is the same as that in Embodiment Mode 2 is used as a nematic liquid crystal and M4851/100 manufactured by Clariant which is different from that in Embodiment Mode 2 is used as a liquid crystal having a smectic phase, FIG. 5 shows a result of measuring a phase transition temperature from an isotropic phase, FIG. 6 shows a result of measuring rise response time (Tr) and fall response time (Td) and obtaining arithmetic average (AVG) of the rise response time (Tr) and the fall response time (Td), and FIG. 7 shows a result of obtaining voltage holding rate.

M4851/100 manufactured by Clariant is a bistable ferroelectric liquid crystal, which conducts phase transition in the order of an isotropic phase, a nematic phase, a smectic A phase, a smectic C phase, and a crystal and is a smectic C phase at 20° C.

As for a mixture in which a ratio of a liquid crystal M4851/100 having a smectic phase is 5 weight %, 10 weight %, and 15 weight %, each of which is 20 weight % or less, it is confirmed that a phase transition temperature from an isotropic phase falls compared with a case of using only a nematic liquid crystal TL215. This is because a liquid crystal that a transition temperature from an isotropic phase is lower influences as can be seen from the result that an I-N transition temperature of a nematic liquid crystal TL215 is 82° C. and an I-N transition temperature of a liquid crystal M4851/100 having a smectic phase is 64.8° C. However, as for a mixture in which a ratio of a liquid crystal M4851/100 having a smectic phase is 5 weight %, 10 weight %, and 15 weight %, a phase transition temperature from an isotropic phase is in a range of 80° C.±0.5° C., which decreases only approximately 2° C. from 82° C.

In the case of using a mixture in which a ratio of a liquid crystal M4851/100 having a smectic phase is 10 weight % and 15 weight %, each of which is 20 weight % or less, it is confirmed that rise response time has a tendency to be shortened by 2.5 msec at a maximum, which is shorter than 13 msec, and arithmetic average of rise response time and fall response time has a tendency to be shorter than 7 msec, which is 5.8 msec or more to 6.2 msec or less, compared with a case of using only a nematic liquid crystal TL215. Fall response time has not exceeded 2 msec.

In the case of using a mixture in which a ratio of a liquid crystal M4851/100 having a smectic phase is 5 weight %, 10 weight %, and 15 weight %, each of which is 20 weight % or less, it is confirmed that voltage holding rate is 98% to 99%, which is little changed, although a ratio of a liquid crystal M4851/100 having a smectic phase in the mixture increases, while voltage holding rate in the case of using only a nematic liquid crystal TL215 is 99%.

EMBODIMENT MODE 4

Figure 8:
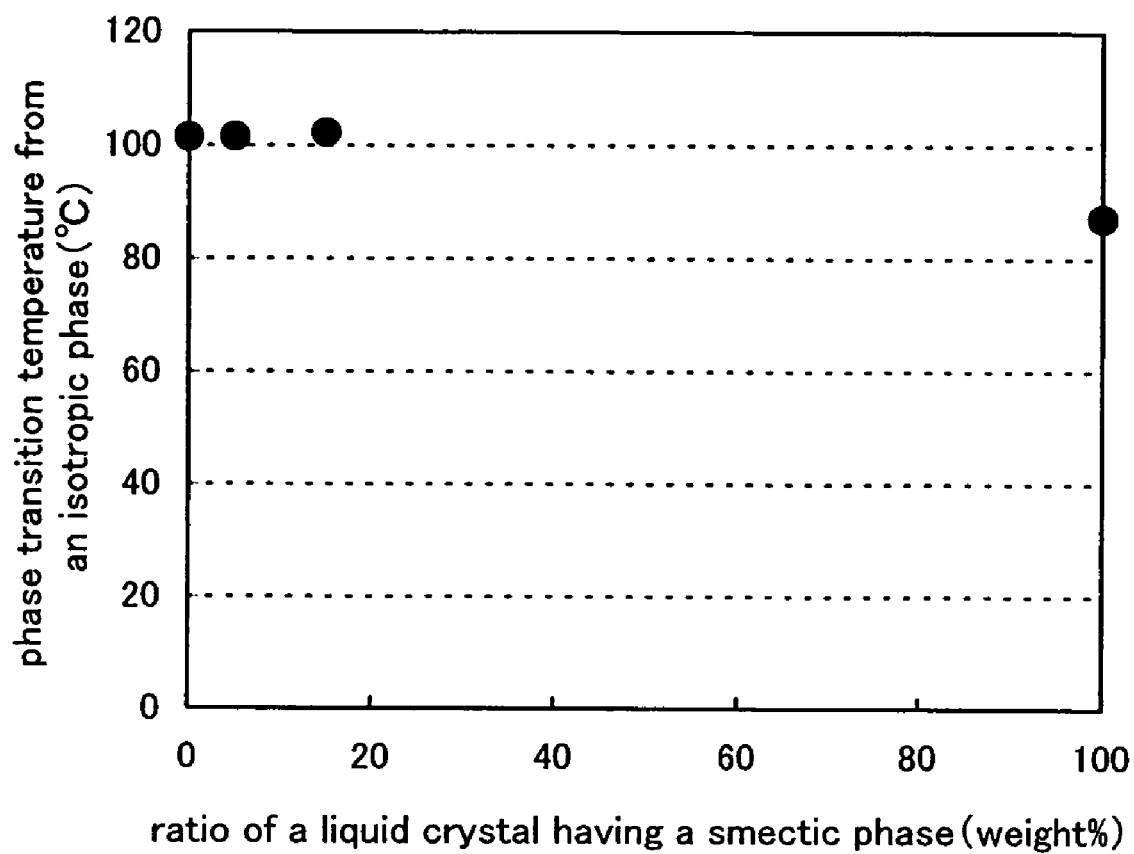
FIG. 8 is a view showing a change of a phase transition temperature from an isotropic phase in Embodiment Mode 4.
Figure 9:
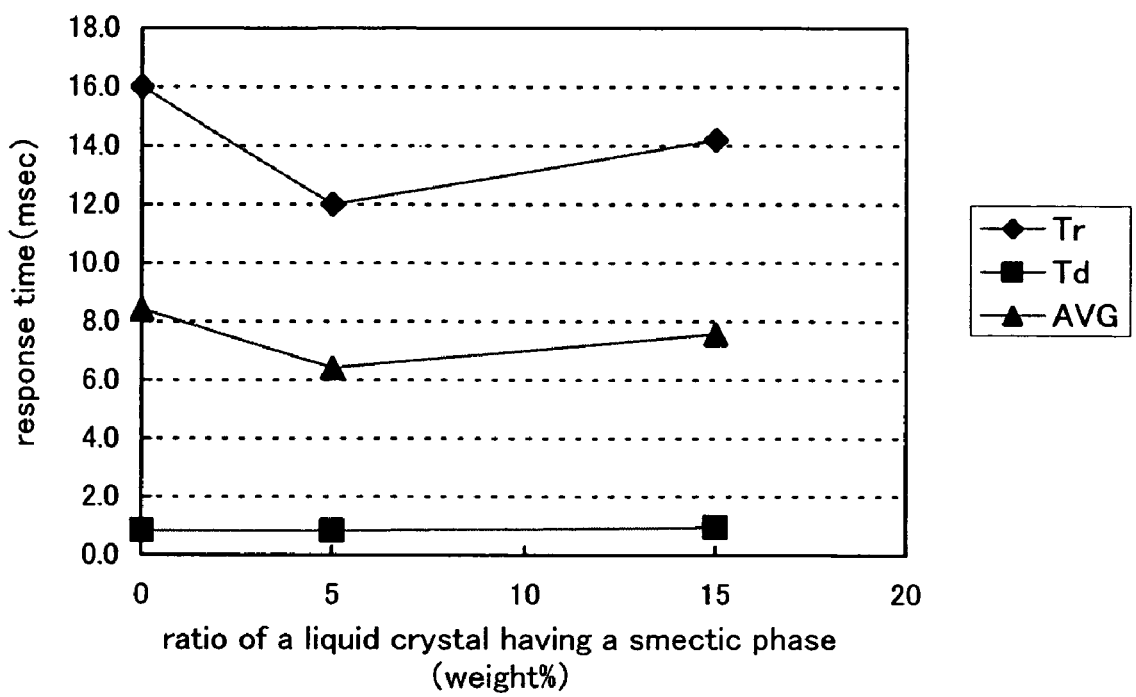
FIG. 9 is a view showing a change of response time in Embodiment Mode 4.
Figure 10:
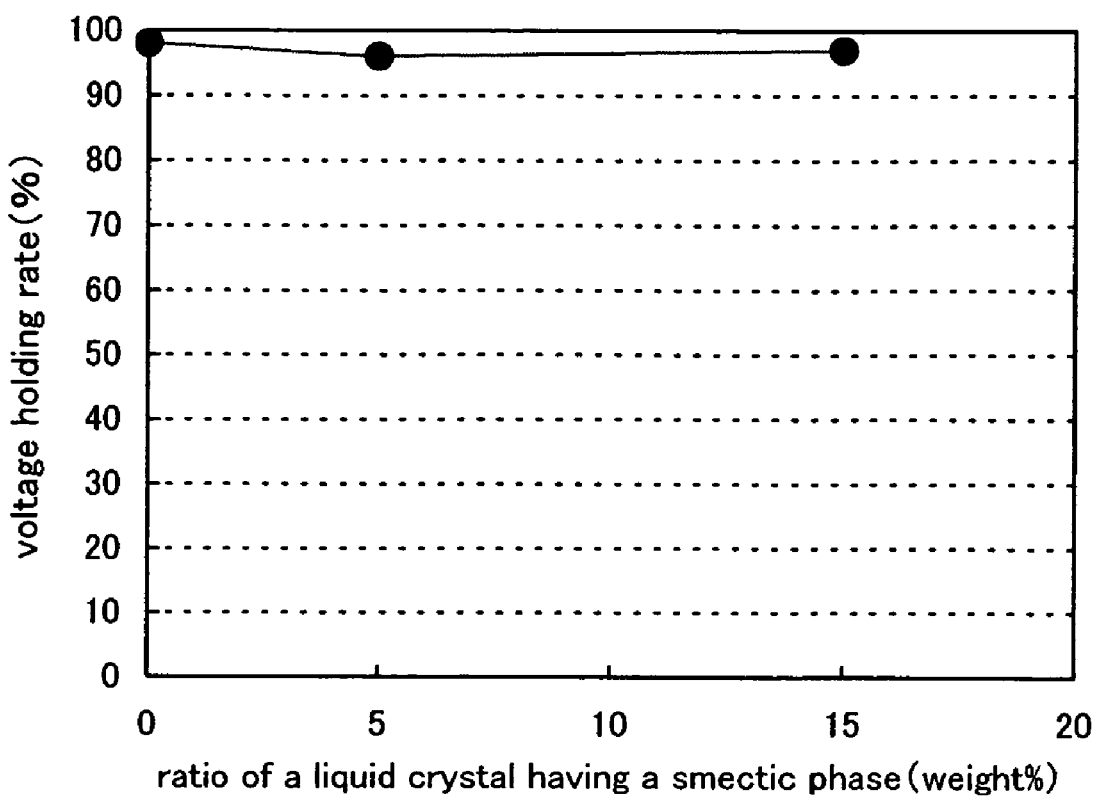
FIG. 10 is a view showing a change of voltage holding rate in Embodiment Mode 4.
Figure 11:
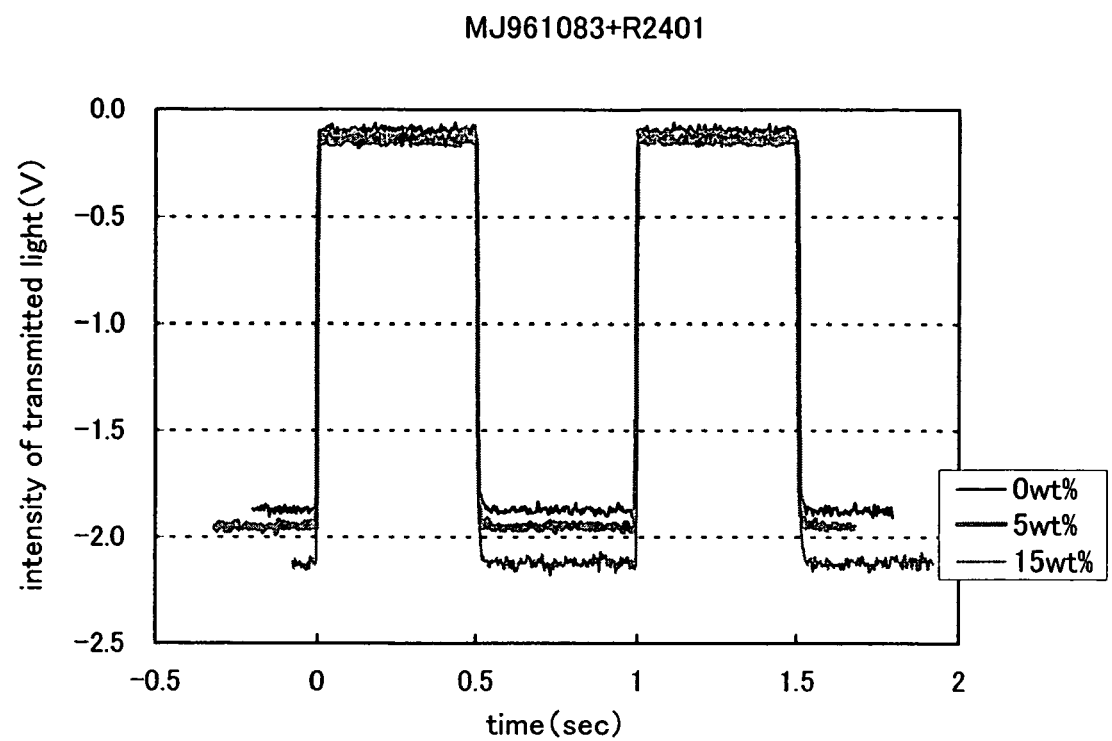
FIG. 11 is a view showing a waveform outputted to an oscilloscope in Embodiment Mode 4.

As for the case of using MJ961083 manufactured by Merck which is different from that in Embodiment Mode 2 as a nematic liquid crystal and R2401 manufactured by Clariant which is the same as that in Embodiment Mode 2 as a liquid crystal having a smectic phase, FIG. 8 shows a result of measuring a phase transition temperature from an isotropic phase, FIG. 9 shows a result of measuring rise response time (Tr) and fall response time (Td) and obtaining arithmetic average (AVG) of the rise response time (Tr) and the fall response time (Td), FIG. 10 shows a result of obtaining voltage holding rate, and FIG. 11 shows a waveform outputted to an oscilloscope showing a change of intensity of light transmitted through the liquid crystal layer with respect to time.

MJ961083 manufactured by Merck is a fluorine-based liquid crystal, which is a nematic phase at 20° C. and an isotropic phase at a temperature which exceeds an I-N transition temperature. Dielectric anisotropy $\Delta\epsilon$ is 10 at 20° C., refractive index anisotropy $\Delta n$ is 0.1355 at 20° C. in the case of using light having a wavelength of 589 nm, and viscosity is 26 $mm^2 s^{-1}$ at 20° C.

As for a mixture in which a ratio of a liquid crystal R2401 having a smectic phase is 5 weight % and 15 weight %, each of which is 20 weight % or less, it is confirmed that a phase transition temperature from an isotropic phase changes little compared with a case of using only a nematic liquid crystal MJ961083. An I-N transition temperature of a nematic liquid crystal MJ961083 is 101.4° C. and an a phase transition temperature from an isotropic phase of a liquid crystal R2401 having a smectic phase is 87.2° C. as described above.

In the case of using a mixture in which a ratio of a liquid crystal R2401 having a smectic phase is 5 weight % and 15 weight %, each of which is 20 weight % or less, it is confirmed that rise response time has a tendency to be shortened by 4 msec at a maximum, which is shorter than 16 msec, and arithmetic average of rise response time and fall response time has a tendency to be shortened by 2 msec at a maximum, which is 8.4 msec or less, compared with a case of using only a nematic liquid crystal MJ961083. Fall response time has not exceeded 2 msec. In this embodiment mode, a product of a cell gap and the refractive index anisotropy $\Delta n$ of the nematic liquid crystal is in the range of 0.27 μm or more to 0.34 μm or less.

In the case of using a mixture in which a ratio of a liquid crystal R2401 having a smectic phase is 5 weight % and 15 weight %, each of which is 20 weight % or less, it is confirmed that voltage holding rate is 96% to 97%, which is little changed, although a ratio of a liquid crystal R2401 having a smectic phase in the mixture increases, while voltage holding rate in the case of using only a nematic liquid crystal MJ961083 is 98%.

Further, it can be judged from FIG. 11 that higher contrast is obtained in the case of using a mixture in which a ratio of a liquid crystal R2401 having a smectic phase is 5 weight %

(referred to as 5 wt % in a legend) and a mixture in which a ratio of a liquid crystal R2401 having a smectic phase is 15 weight % (referred togas 15 wt % in the legend) compared with a case of using only a nematic liquid crystal MJ961083 (referred to as 0 wt % in the legend). In FIG. 11, the intensity of light transmitted through the liquid crystal layer becomes smaller and display becomes darker (this can be expressed as "black level is enhanced") as a value of a vertical axis approaches zero, and the intensity of light transmitted through the liquid crystal layer becomes larger and display becomes brighter (this can be expressed as "white level is enhanced") as an absolute value of a vertical axis increases. Thus, FIG. 11 shows that white level is more enhanced by using a mixture in which a ratio of a liquid crystal R2401 having a smectic phase is 5 weight % and 15 weight % compared with the case of using only a nematic liquid crystal MJ961083. Although not shown in FIG. 11, white level is enhanced and high contrast is obtained also in the case of using a mixture in which a ratio of a liquid crystal R2401 having a smectic phase is 10 weight % compared with the case of using only a nematic liquid crystal MJ961083.

EMBODIMENT MODE 5

Figure 12:
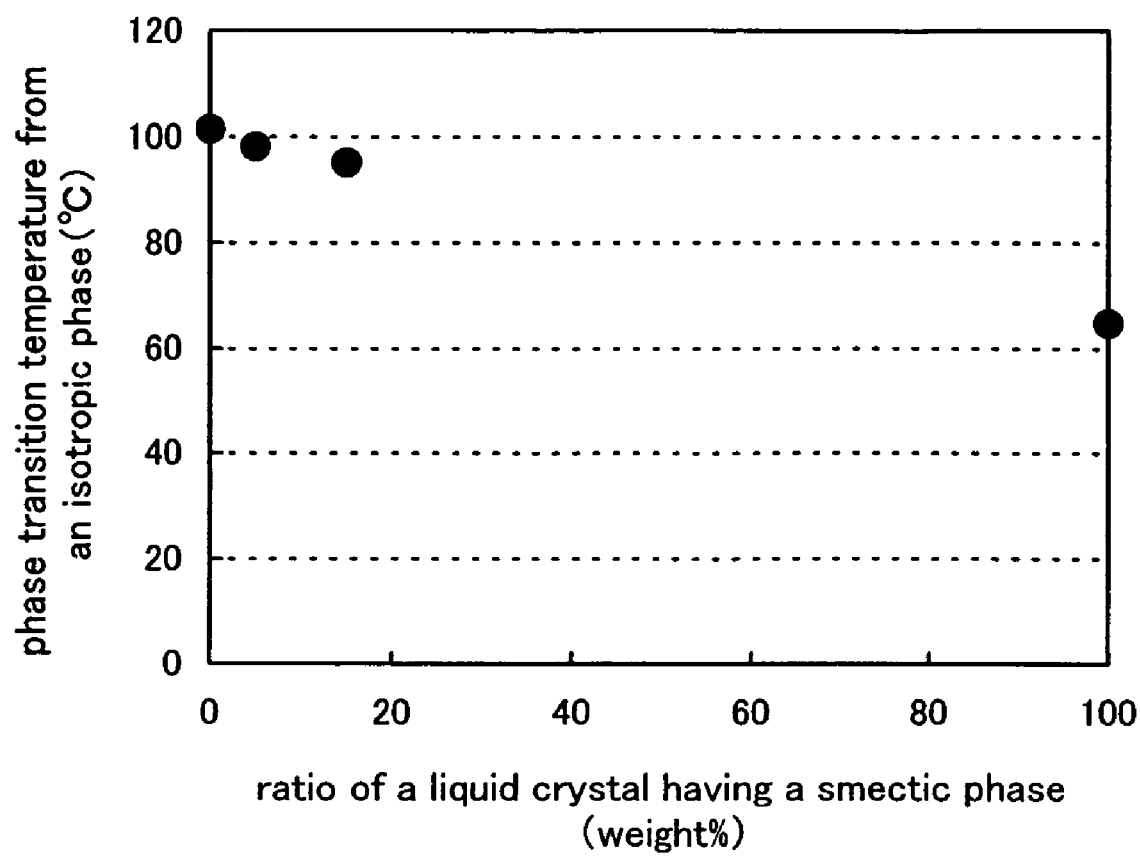
FIG. 12 is a view showing a change of a phase transition temperature from an isotropic phase in Embodiment Mode 5.
Figure 13:
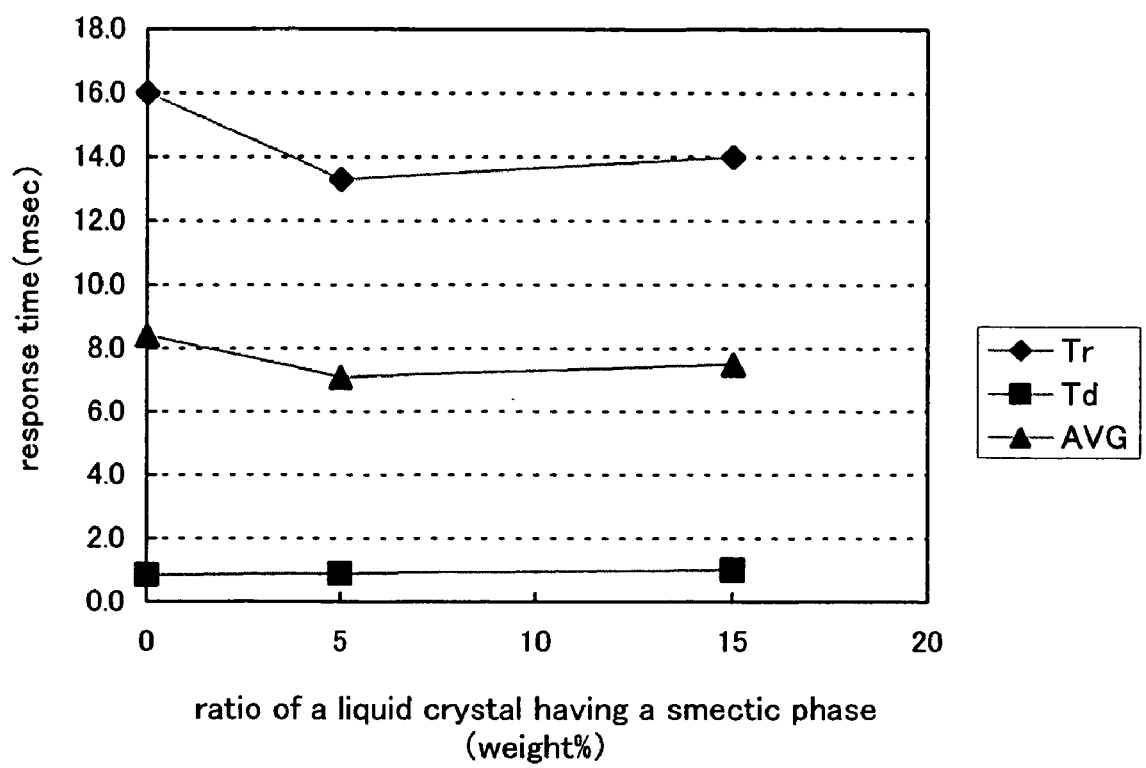
FIG. 13 is a view showing a change of response time in Embodiment Mode 5.
Figure 14:
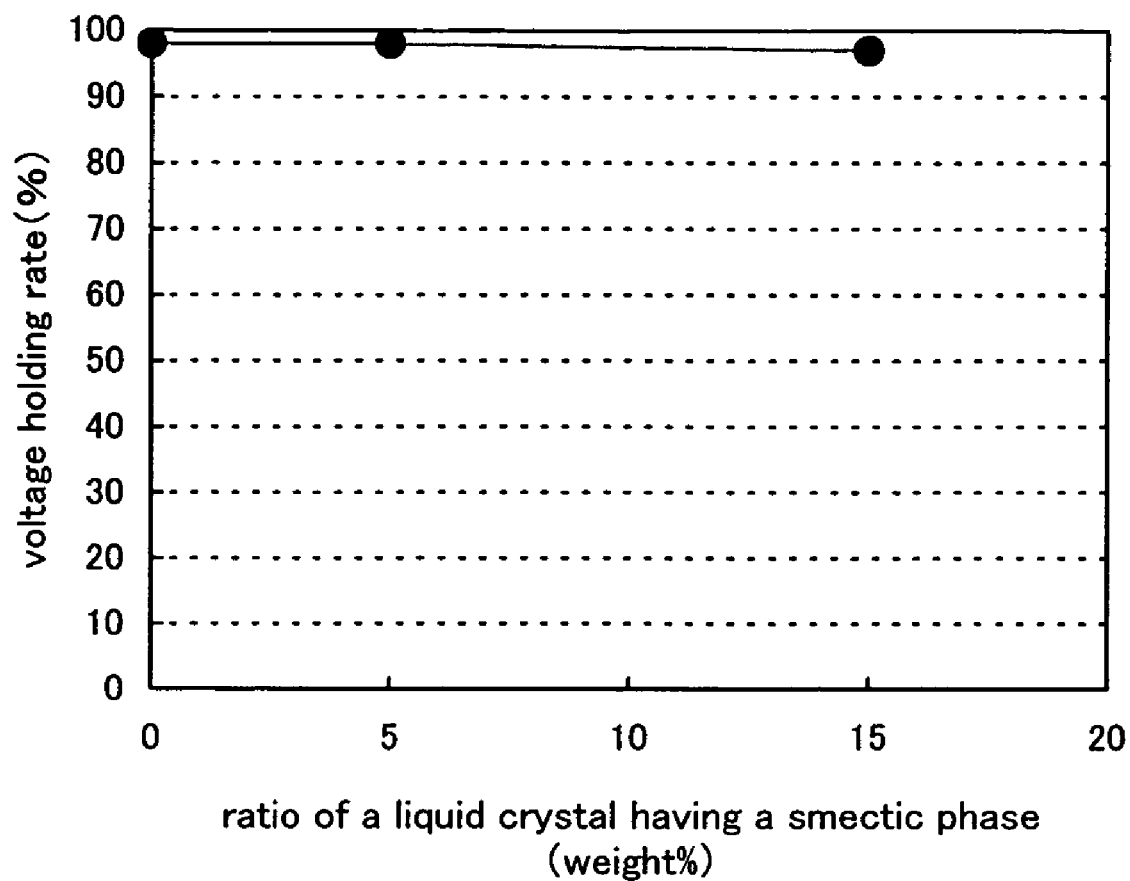
FIG. 14 is a view showing a change of voltage holding rate in Embodiment Mode 5.
Figure 15:
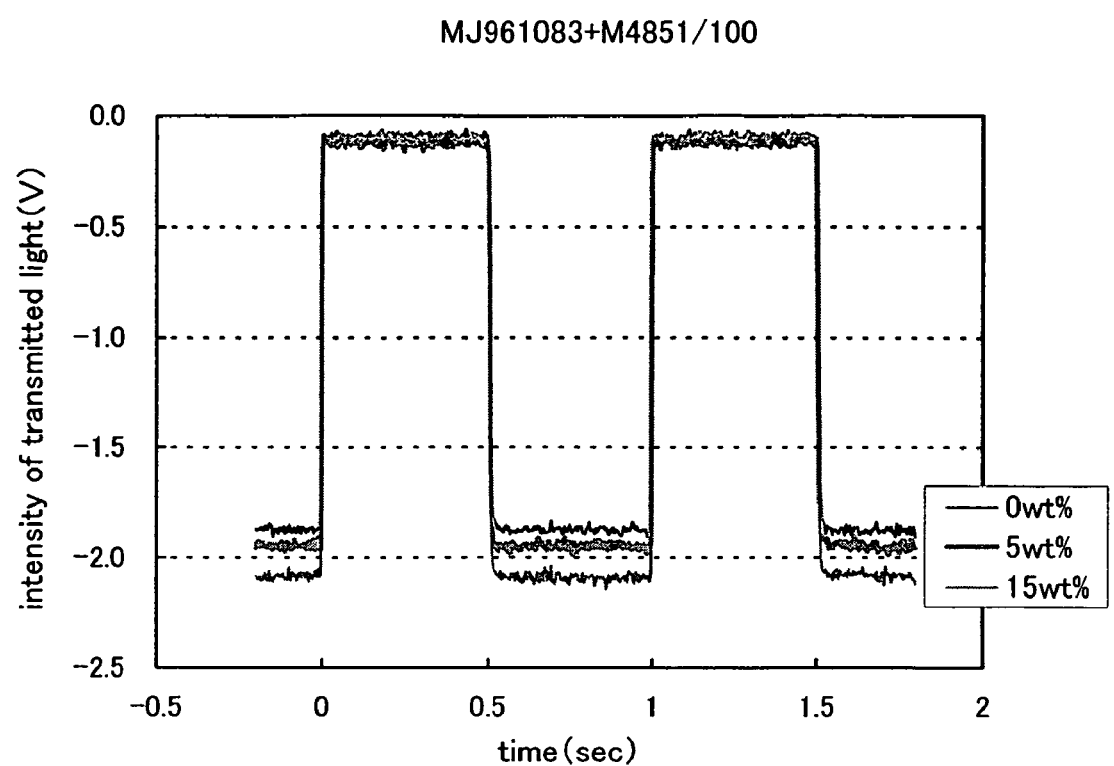
FIG. 15 is a view showing a waveform outputted to an oscilloscope in Embodiment Mode 5.

As for the case of using MJ961083 manufactured by Merck which is the same as that in Embodiment Mode 4 as a nematic liquid crystal and M4851/100 manufactured by Clariant which is the same as that in Embodiment Mode 3 as a liquid crystal having a smectic phase, FIG. 12 shows a result of measuring a phase transition temperature from an isotropic phase, FIG. 13 shows a result of measuring rise response time (Tr) and fall response time (Td) and obtaining arithmetic average (AVG) of the rise response time (Tr) and the fall response time (Td), FIG. 14 shows a result of obtaining voltage holding rate, and FIG. 15 shows a waveform outputted to an oscilloscope showing a change of intensity of light transmitted through a liquid crystal layer with respect to time.

As for a mixture in which a ratio of a liquid crystal M4851/100 having a smectic phase is 5 weight % and 15 weight %, each of which is 20 weight % or less, it is confirmed that a phase transition temperature from an isotropic phase falls when a ratio of a liquid crystal M4851/100 having a smectic phase in the mixture increases compared with a case of using only a nematic liquid crystal MJ961083. This is because a liquid crystal that an I-N transition temperature is lower influences as can be seen from the result that an I-N transition temperature of a nematic liquid crystal MJ961083 is 101.4° C. and an I-N transition temperature of a liquid crystal M4851/100 having a smectic phase is 64.8° C.

In the case of using a mixture in which a ratio of a liquid crystal M4851/100 having a smectic phase is 5 weight % and 15 weight %, each of which is 20 weight % or less, it is confirmed that rise response time has a tendency to be shortened by 2.7 msec at a maximum, which is shorter than 16 msec, and arithmetic average of rise response time and fall response time has a tendency to be 8 msec or less, which is shortened by 1.3 msec at a maximum and shorter than 8.4 msec, compared with a case of using only a nematic liquid crystal MJ961083. Fall response time has not exceeded 2 msec. In this embodiment mode, a product of a cell gap and the refractive index anisotropy Δn of the nematic liquid crystal is in the range of 0.27 μm or more to 0.34 μm or less.

As for a mixture in which a ratio of a liquid crystal M4851/100 having a smectic phase is 5 weight % and 15 weight %, each of which is 20 weight % or less, it is confirmed that voltage holding rate is 97% to 98%, which is little changed, although a ratio of a liquid crystal M4851/100 having a smectic phase in the mixture increases, while voltage holding rate in the case of using only a nematic liquid crystal MJ961083 is 98%.

Further, it can be judged from FIG. 15 that higher contrast is obtained in the case of using a mixture in which a liquid crystal M4851/100 having a smectic phase is 5 weight % (referred to as 5 wt % in a legend) and a mixture in which a ratio of a liquid crystal M4851/100 having a smectic phase is 15 weight % (referred to as 15 wt % in the legend) compared with a case of using only a nematic liquid crystal MJ961083 (referred to as 0 wt % in the legend). In FIG. 15, the intensity of light transmitted through the liquid crystal layer becomes smaller and display becomes darker (this can be expressed as "black level is enhanced") as a value of a vertical axis approaches zero, and the intensity of light transmitted through the liquid crystal layer becomes larger and display becomes brighter (this can be expressed as "white level is enhanced") as an absolute value of a vertical axis increases. Thus, FIG. 15 shows that white level is more enhanced by using a mixture in which a ratio a liquid crystal M4851/100 having a smectic phase is 5 weight % and 15 weight % compared with the case of using only a nematic liquid crystal MJ961083. Although not shown in FIG. 15, white level is enhanced and high contrast is obtained also in the case of using a mixture in which a liquid crystal M4851/100 having a smectic phase is 10 weight % compared with the case of using only a nematic liquid crystal MJ961083.

The above results can be applied to any of a simple matrix liquid crystal electro-optical device and an active matrix liquid crystal electro-optical device, and further, the above results can be applied to any of a transmission type liquid crystal electro-optical device and a reflection type liquid crystal electro-optical device.

EMBODIMENT 1

Figure 16:
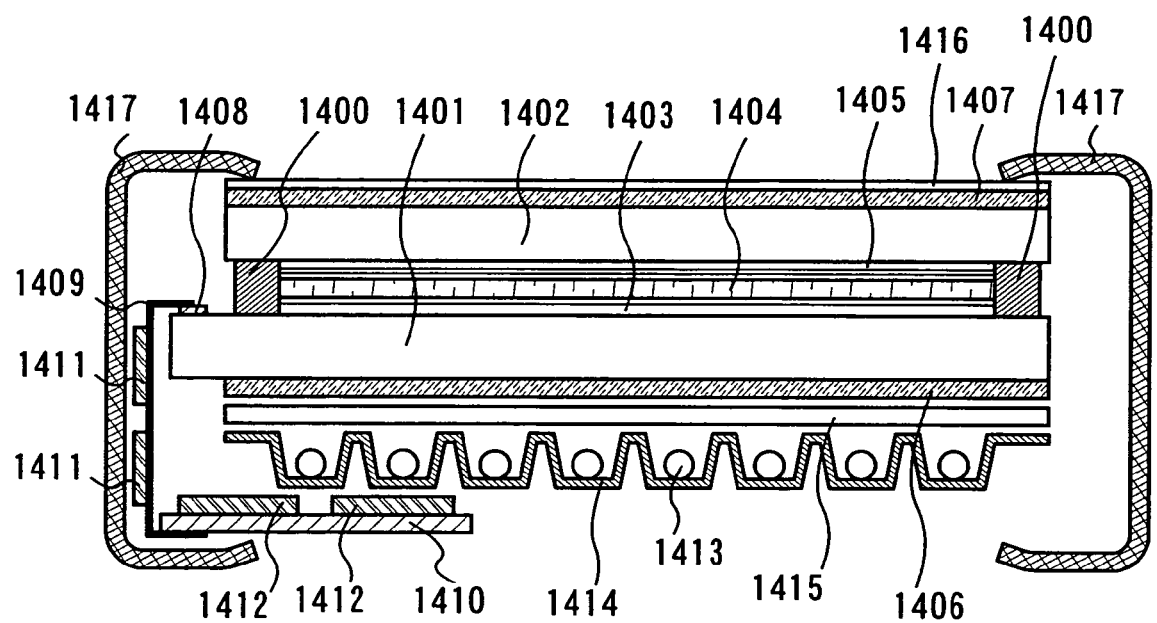
FIG. 16 is a view showing a liquid crystal electro-optical device in Embodiment 1.

One example of a liquid crystal electro-optical device to which the present invention disclosed in this specification is applied is shown with reference to FIG. 16.

A liquid crystal layer 1404 is included between a first substrate 1401 and a second substrate 1402, and the first substrate and the second substrate are adhered to each other by a seal material 1400. As the liquid crystal layer 1404, a mixture of a nematic liquid crystal and a liquid crystal having a smectic phase, which is an object added with a chiral agent in a predetermined ratio and including a liquid crystal having a smectic phase in a ratio shown in Embodiment Modes 1, 2, 3, 4, or 5 within a range which does not exceed 20 weight %, is used. A cell gap is 2.0 μm or more to 2.5 μm or less in the similar way as in Embodiment Mode 1.

A pixel portion 1403 is formed over the first substrate 1401 and a colored layer 1405 is formed over the second substrate. The colored layer 1405 is required when color display is conducted, and in the case of a RBG method, a colored layer corresponding to each color of red, green, and blue is provided corresponding to each pixel. A counter electrode and an orientation film are provided over the colored layer 1405. Polarizing plates 1406 and 1407 are provided outside the first substrate 1401 and the second substrate 1402, respectively. A protective film 1416 is formed over the surface of the polarizing plate 1407 to relieve impact from outside.

A pixel electrode and one or a plurality of thin film transistors which is/are electrically connected to the pixel electrode are provided for the pixel portion 1403 so as to correspond to each pixel. An orientation film is provided over the pixel portion 1403.

A connection terminal 1408 provided for the first substrate 1401 is connected to a wiring board 1410 through a FPC 1409. A driver circuit 1411 formed of an IC chip is provided for the FPC 1409 or a connection wiring, and an external circuit 1412 such as a control circuit or a power supply circuit is provided for the wiring board 1410.

A cold cathode tube 1413, a reflector 1414, and an optical film 1415 are backlight units, and these are light sources. The first substrate 1401, the second substrate 1402, the light source, the wiring board 1410, and the FPC 1409 are held and protected by a bezel 1417.

The liquid crystal electro-optical device shown in this embodiment is mounted on an electronic device, for example, a mobile phone, a television receiver, a camera such as a digital camera, a personal computer such as a laptop computer, a liquid crystal projector.

EMBODIMENT 2

Figure 17:
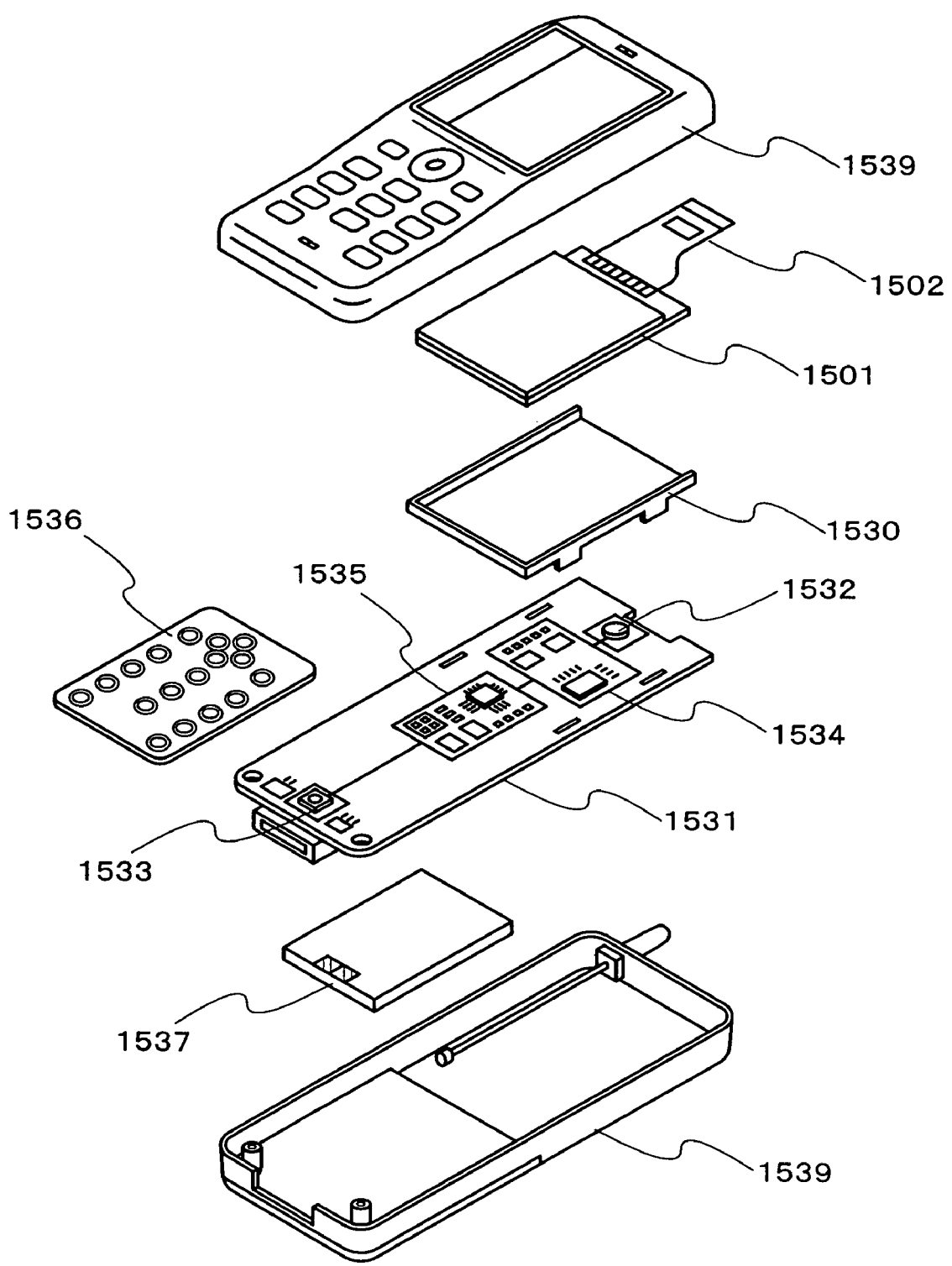
FIG. 17 is a view showing a mobile phone in Embodiment 2.

FIG. 17 shows one example of a mobile phone mounted with a liquid crystal electro-optical device to which the present invention disclosed in this specification is applied, for example, a liquid crystal electro-optical device shown in Embodiment 1.

A liquid crystal electro-optical device 1501 is incorporated into a housing 1530 so as to be freely detached/attached. The housing 1530 can be changed in form and size depending on the size of the liquid crystal electro-optical device 1501. The housing 1530 to which the liquid crystal electro-optical device 1501 is fixed is fitted into a printed wiring board 1531 and built as a module.

The liquid crystal electro-optical device 1501 is connected to the printed wiring board 1531 through a FPC 1502. The printed wiring board 1531 is provided with a speaker 1532, a microphone 1533, a sending and receiving circuit 1534, and a signal processing circuit 1535 including a CPU, a controller, and the like. Such a module is combined with an input means 1536 and a buttery 1537 and stored in a chassis 1539. A pixel portion of the liquid crystal electro-optical device 1501 is placed so as to be seen through an opening window formed in the chassis 1539.

In the mobile phone in this embodiment, by mounting a liquid crystal electro-optical device in which a mixture of a nematic liquid crystal and a liquid crystal having a smectic phase mixed at a predetermined ratio is used for a liquid crystal layer, which is a feature of the invention disclosed in this specification, the reduction of afterimage and the enhancement of contrast can be attempted and flicker or the like in a display is not required to be concerned, and an effect which is suitable for displaying not only a still image but a moving image is achieved. Further, by using a mixture of a liquid crystal having a smectic phase that a phase transition temperature from an isotropic phase is higher than an I-N transition temperature of a nematic liquid crystal, a phase transition temperature from an isotropic phase becomes high; therefore, an effect that an operating temperature range can be widened is achieved.

The mobile phone according to this embodiment can be transformed into various modes depending on the function and use of the mobile phone. For example, the above-described effect can be achieved even if a structure having a plurality of liquid crystal electro-optical devices or an opening and shutting structure using a hinge by dividing a chassis into a plurality of pieces arbitrarily is employed.

EMBODIMENT 3

Figure 18A:
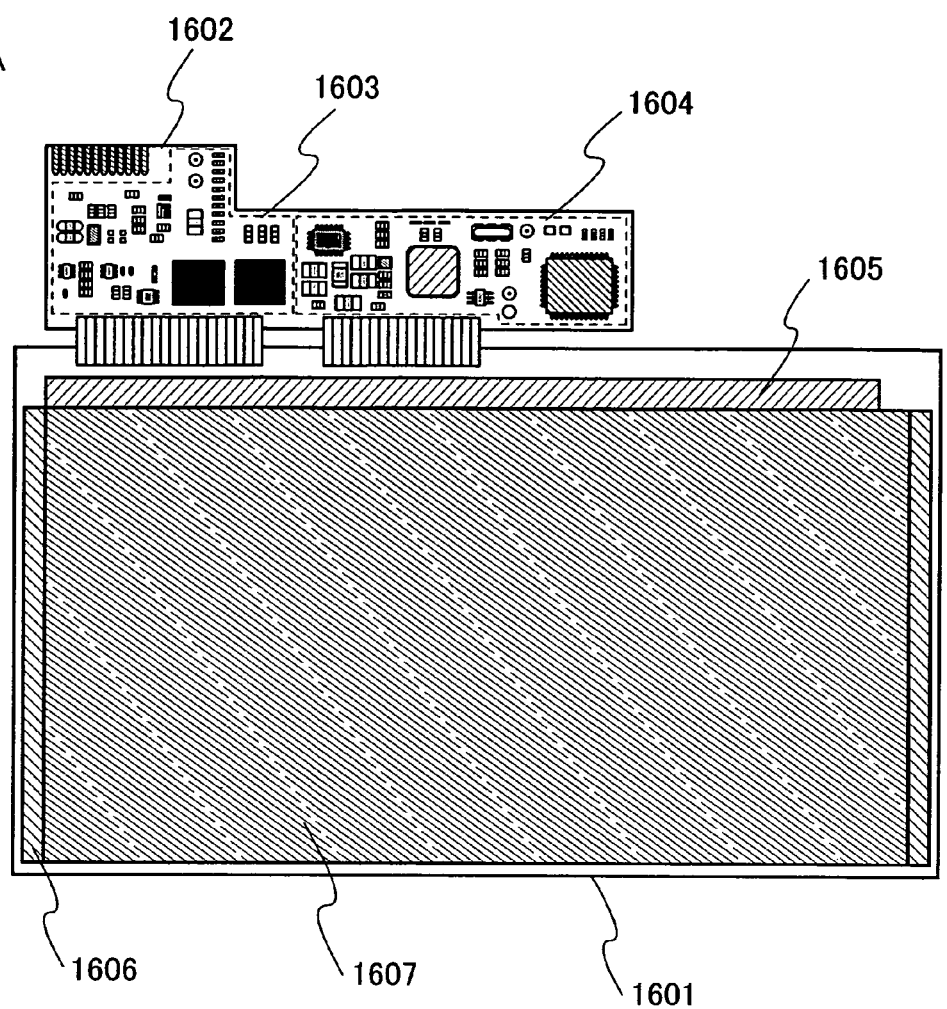
FIGS. 18A and 18B are views showing a television receiver in Embodiment 3.

FIG. 18A shows a liquid crystal electro-optical device which is mounted on a television receiver (liquid crystal television) and in which a display panel 1601 and a circuit board 1602 are combined. The circuit board 1602 is provided with, for example, a control circuit 1603 and a signal dividing circuit 1604. FIG. 18A shows an example in which a signal line driver circuit 1605 and a scanning line driver circuit 1606 are formed over the same substrate as that of a pixel portion 1607; however, only one of the signal line driver circuit 1605 and the scanning line driver circuit 1606 may be formed over the same substrate as that of the pixel portion 1607 or only a part of a component of one or both of the signal line driver circuit 1605 and the scanning line driver circuit 1606 may be formed over the same substrate as that of the pixel portion 1607.

A mixture of a nematic liquid crystal and a liquid crystal having a smectic phase mixed at a predetermined ratio, which is a feature of the invention disclosed in this specification, is used for a liquid crystal layer of the display panel 1601.

Figure 18B:
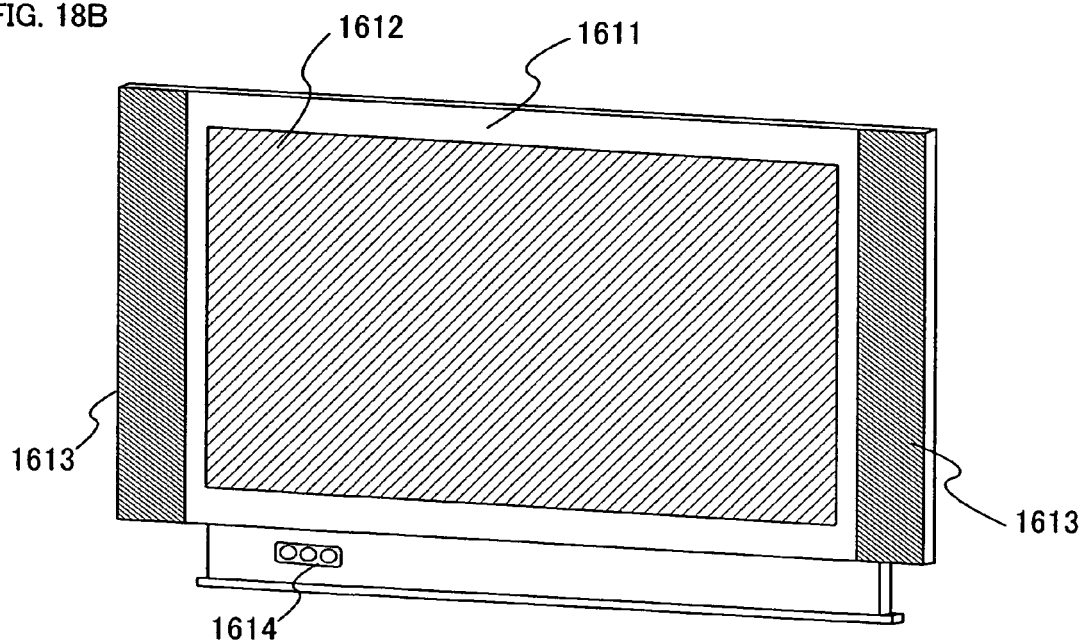

A television receiver that one example is shown in FIG. 18B can be completed by incorporating the liquid crystal electro-optical device shown in FIG. 18A into a chassis 1611. A display screen 1612 is formed by the liquid crystal electro-optical device. The television receiver is appropriately provided with a speaker 1613, an operation switch 1614, and the like.

In the television receiver (liquid crystal television) in this embodiment, by mounting a liquid crystal electro-optical device in which a mixture of a nematic liquid crystal and a liquid crystal having a smectic phase mixed at a predetermined ratio is used for a liquid crystal layer on, which is a feature of the invention disclosed in this specification, the reduction of afterimage and the enhancement of contrast can be attempted and flicker or the like in a display is not required to be concerned, and an effect which is suitable for displaying a moving image is achieved. Further, by using a mixture of a liquid crystal having a smectic phase that a phase transition temperature from an isotropic phase is higher than an I-N transition temperature of a nematic liquid crystal, a phase transition temperature from an isotropic phase becomes high; therefore, an effect that an operating temperature range can be widened is achieved.

EMBODIMENT 4

One example of a projection type display device (liquid crystal projector) mounted with a liquid crystal electro-optical device to which the present invention disclosed in this specification is applied is shown.

Figure 19A:
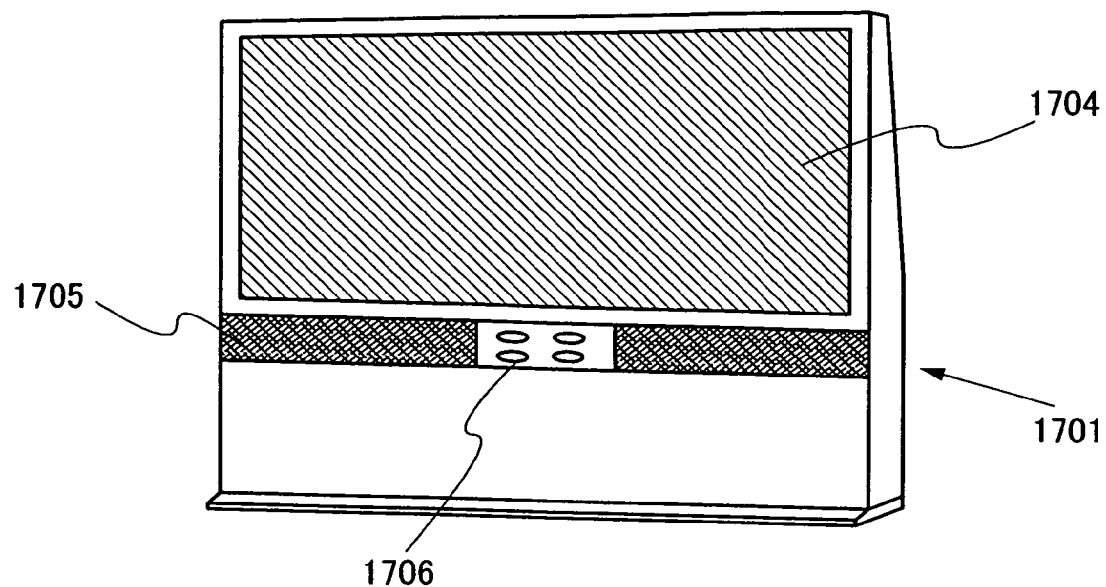
FIGS. 19A and 19B are views showing a rear-projection type display device in Embodiment 4.
Figure 19B:
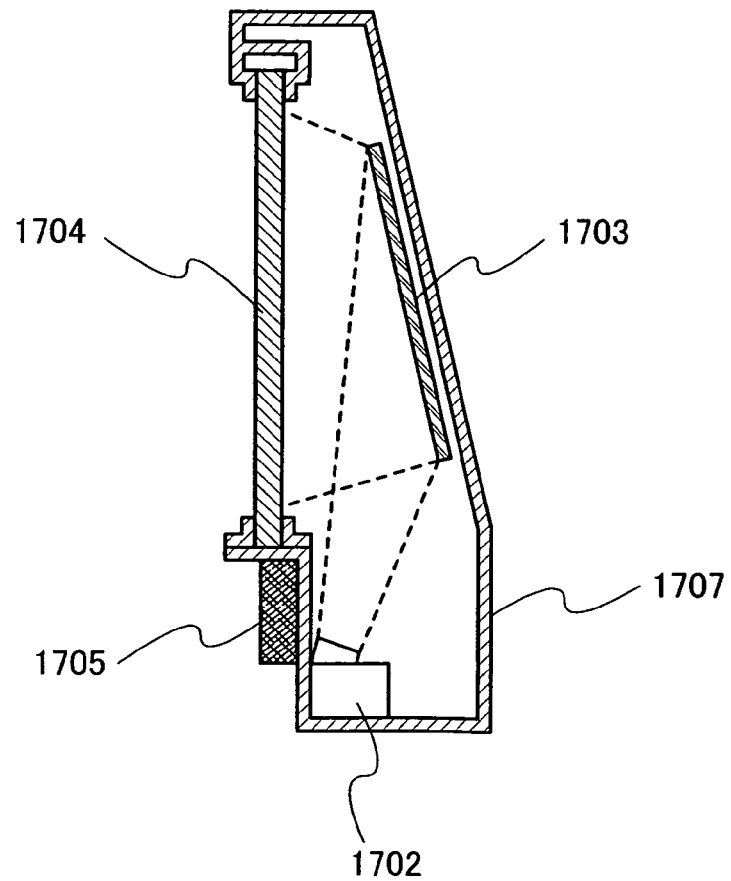

A rear-projection type display device 1701 shown in FIGS. 19A and 19B includes a projector unit 1702, a mirror 1703, and a screen 1704. In addition, a speaker 1705 and operation switches 1706 may also be included. The projector unit 1702 is placed in the lower position of a chassis 1707 of the rear-projection type display device 1701, and projects light for showing an image toward the mirror 1703 based on an image signal. The rear-projection type display device 1701 displays an image which is projected from the backside of the screen 1704.

Figure 20:
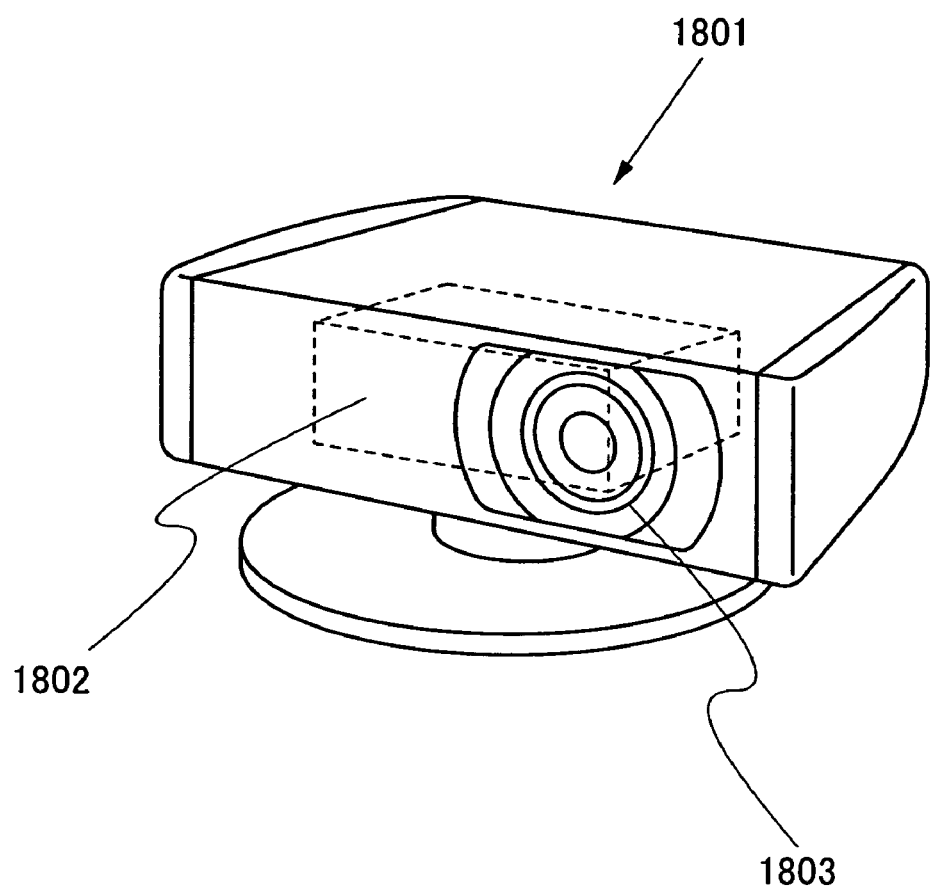
FIG. 20 is a view showing a front-projection type display device in Embodiment 4.

On the other hand, FIG. 20 shows a front-projection type display device 1801. The front-projection type display device 1801 includes a projector unit 1802 and a projection optical system 1803. The front-projection type display device 1801 projects an image on a screen and the like placed in front.

The structures of projector units 1702 and 1802 which are applied to the rear-projection type display device 1701 shown in FIGS. 19A and 19B and the front-projection type display device 1801 shown in FIG. 20, respectively, will be described below.

Figure 21:
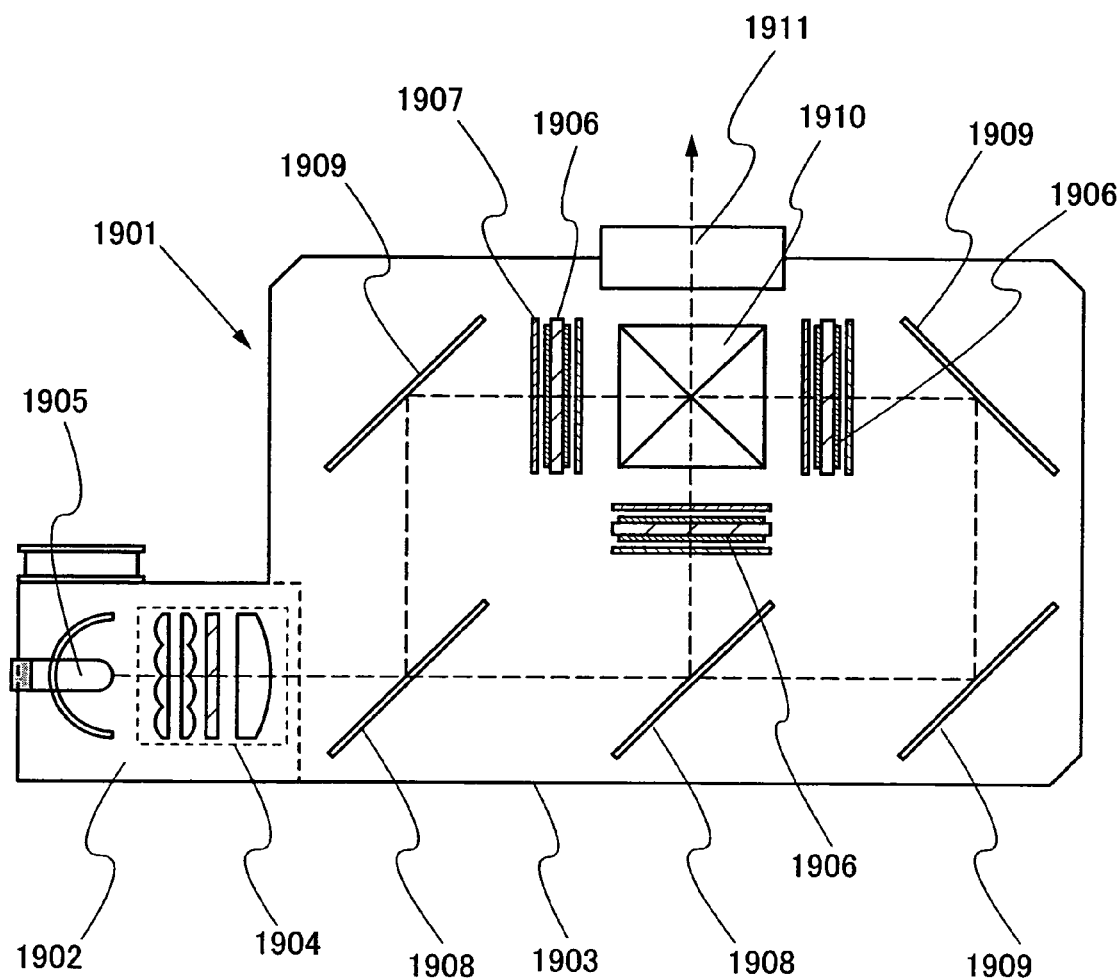
FIG. 21 is a view showing a structure of a projector unit of a projection type display device in Embodiment 4.

FIG. 21 is one example of a projector unit. The projector unit 1901 includes a light source unit 1902 and a modulation unit 1903. The light source unit 1902 includes a light source optical system 1904 composed of lenses, and a light source lamp 1905. The light source lamp 1905 is stored in a chassis not to diffuse stray light. As the light source lamp 1905, for example, a high pressure mercury lamp, a xenon lamp, or the like is used, which is capable of emitting the large amount of light. The light source optical system 1904 is composed by appropriately including an optical lens, a film having a polarizing property, a film for adjusting a phase difference, an IR film, and the like. Then, the light source unit 1902 is placed so that emitted light goes into the modulation unit 1903. The modulation unit 1903 includes a plurality of liquid crystal electro-optical devices 1906, a retardation film 1907, a dichroic mirror 1908, a total reflection mirror 1909, a prism 1910, and a projection optical system 1911. Light emitted from the light source unit 1902 is divided into a plurality of optical paths by the dichroic mirror 1908.

Each optical path is provided with the liquid crystal electro-optical device 1906 with a color filter which transmits a light having a predetermined wavelength or wavelength range. Transmitted light is modulated by the liquid crystal electro-optical device 1906 which is a transmission type based on an image signal. Light of each color transmitted through the liquid crystal electro-optical device 1906 goes into the prism 1910 so that an image is displayed on a screen through the projection optical system 1911. A projection light which is projected by the projector unit 1901 and reflected by the mirror according to need is converted to almost parallel light by a fresnel lens and projected on the screen.

Figure 22:
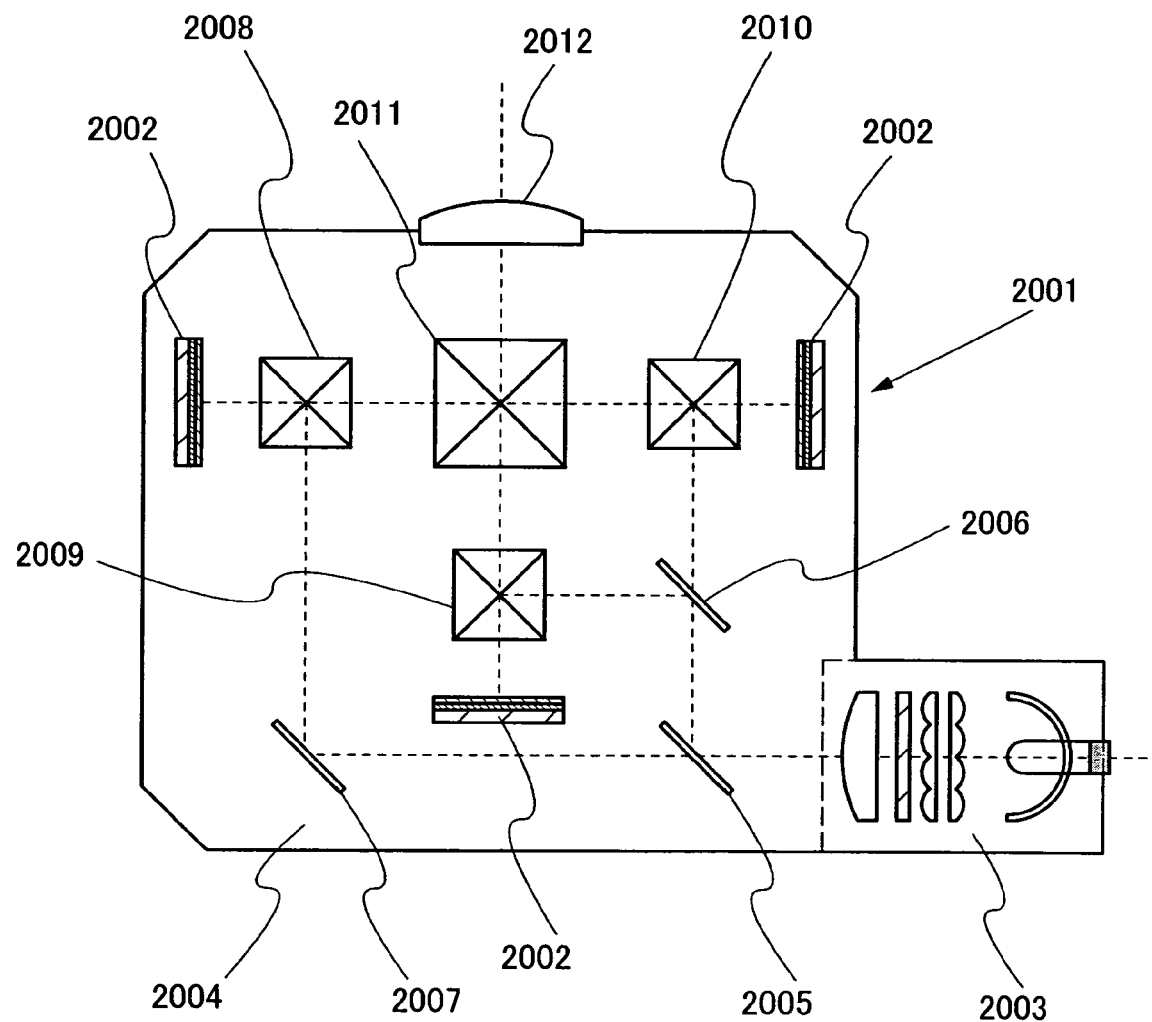
FIG. 22 is a view showing a structure of a projector unit of a projection type display device in Embodiment 4.

A projector unit 2001 shown in FIG. 22 has a structure which is provided with a plurality of reflection type liquid crystal electro-optical devices 2002. In a liquid crystal electro-optical device in embodiment 1, the reflection type liquid crystal electro-optical device 2002 may have a structure in which a pixel electrode in a pixel portion is formed from metal like aluminum or titanium, or an alloy of these metals, and at least one of substrates among a pair of substrates may have a light-transmitting property.

The projector unit 2001 includes a light source unit 2003 and a modulation unit 2004. The light source unit 2003 has the same structure as a light source unit 1902 shown in FIG. 21. Of the light emitted from the light source unit 2003, only light of a wavelength region of red is transmitted through a dichroic mirror 2005, and light of a wavelength region of green and blue is reflected by the dichroic mirror 2005. Further, only light of a wavelength region of green is reflected by a dichroic mirror 2006. The light of a wavelength region of red, which has been transmitted through the dichroic mirror 2005, is reflected by a total reflection mirror 2007, and goes into a polarizing beam splitter 2008. In addition, the light of a wavelength region of green goes into a polarizing beam splitter 2009, and the light of a wavelength region of blue goes into a polarizing beam splitter 2010. The polarizing beam splitters 2008, 2009, and 2010 have a function of dividing incident light to a P-polarized light and an S-polarized light, and a function of transmitting the P-polarized light. The polarizing beam splitters 2008, 2009, and 2010 are placed so as to correspond each of the plurality of the reflection type liquid crystal electro-optical devices 2002. The light of each color reflected by the reflection type liquid crystal electro-optical device 2002 and transmitted through the polarizing beam splitter goes into a prism 2011 and projected on a screen through a projection optical system 2012.

The projector unit shown in FIG. 22 can be applied to the rear-projection type display device shown in FIGS. 19A and 19B and the front-projection type display device shown in FIG. 20.

Figure 23A:
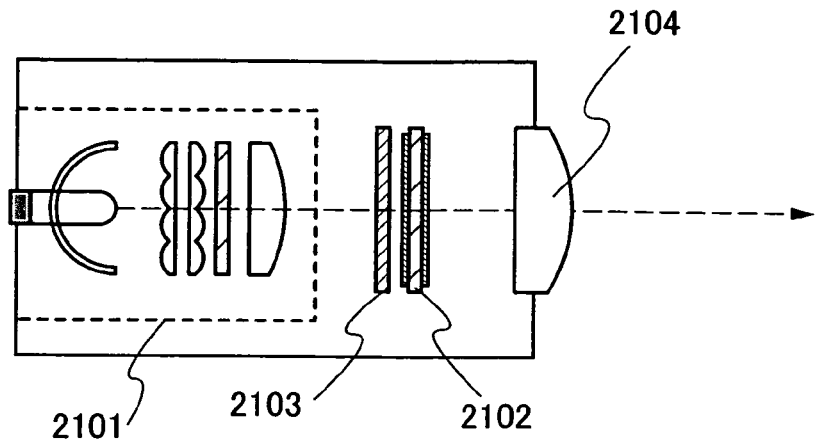
FIGS. 23A to 23C are views showing a structure of a projector unit of a projection type display device in Embodiment 4.
Figure 23B:
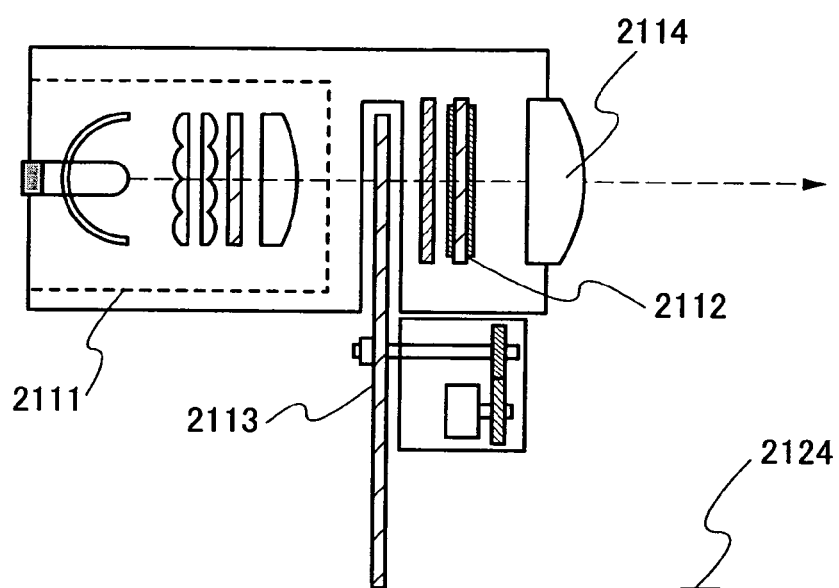
Figure 23C:
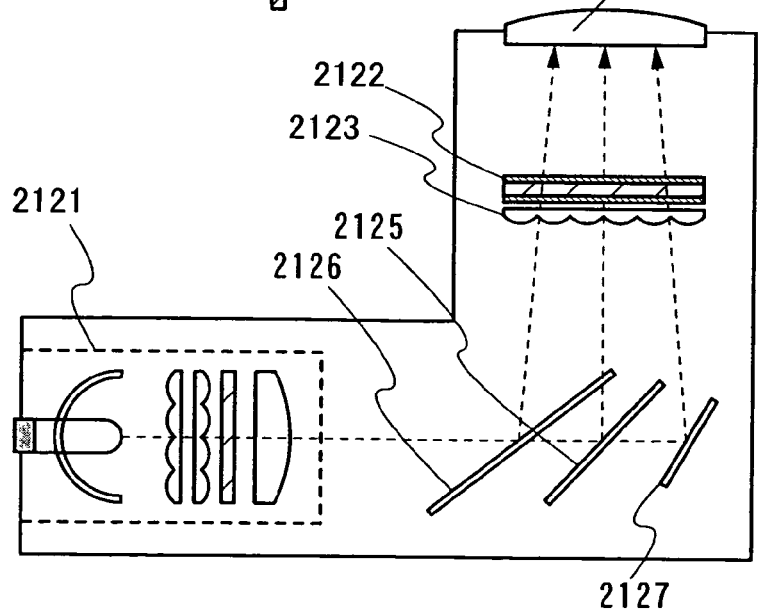

Projector units shown in each of FIGS. 23A to 23C have a single-plate structure. The projector unit shown in FIG. 23A includes a light source unit 2101, a liquid crystal electro-optical device 2102, a retardation film 2103, and a projection optical system 2104. The projection optical system 2104 is composed of one or a plurality of lenses. The liquid crystal electro-optical device 2102 is provided with a color filter.

FIG. 23B shows the structure of a projector unit which operates in a field sequential mode. The field sequential mode is a mode by which light of each color such as red, green, or blue is made to go into a liquid crystal panel sequentially with a time lag, and color display is conducted without a color filter. In particular, when the field sequential mode is combined with a fast-response liquid crystal electro-optical device, high-definition images can be displayed. The projector unit shown in FIG. 23B is provided with a rotary color filter plate 2113 having a plurality of color filters for red, green, blue, and the like between a light source unit 2111 and a liquid crystal electro-optical device 2112 and further provided with a projection optical system 2114.

A projector unit shown in FIG. 23C has a structure of a color separation system using a micro lens as a color display system. In this system, a micro lens array 2123 is provided on a light incidence side of a liquid crystal electro-optical device 2122, and light of each color is illuminated from each direction to accomplish color display. In a projector unit which employs this system, no light is lost due to a color filter, and thus, the projector unit has a feature that light from a light source unit 2121 can be used effectively. The projector unit shown in FIG. 23C is provided with dichroic mirrors 2125, 2126, and 2127 so that light of each color is illuminated from each direction to the liquid crystal electro-optical device 2122 and further provided with a projection optical system 2124.

In the projection type display device (liquid crystal projector) according to the embodiment, by mounting a liquid crystal electro-optical device in which a mixture of a nematic liquid crystal and a liquid crystal having a smectic phase at a predetermined ratio is used for a liquid crystal layer, which is a feature of the invention disclosed in this specification, the reduction of afterimage and the enhancement of contrast can be attempted and flicker or the like in a display is not required to be concerned, and an effect which is suitable for displaying a moving image is achieved. Especially, a liquid crystal electro-optical device to which the invention disclosed in this specification is applied is preferable as a liquid crystal electro-optical device used for a projector unit operating by a field sequential method. Further, by using a mixture of a liquid crystal having a smectic phase that a phase transition temperature from an isotropic phase is higher than an I-N transition temperature of a nematic liquid crystal, a phase transition temperature from an isotropic phase becomes high; therefore, an effect that an operating temperature range can be widened is achieved.

The invention disclosed in this specification can be applied to not only an electronic device shown in each of Embodiments 2 to 4 described above but another electronic device mounted with a liquid crystal electro-optical device.

Embodiment modes according to the present invention are described in detail with reference to the drawings. However, it is easily understood by those who are skilled in the art that embodiments and details herein disclosed can be modified in various ways without departing from the purpose and the scope of the present invention. Therefore, it should be noted that the description of embodiment modes to be given below should not be interpreted as limiting the present invention.

This application is based on Japanese Patent Application serial No. 2004-337397 field in Japan Patent Office on Nov. 22, 2004, the contents of which are hereby incorporated by reference.

What is claimed is:

1. A liquid crystal electro-optical device comprising:
a first substrate,
a first electrode over the first substrate,
a first orientation film covering the first electrode, and
a second substrate opposed to the first substrate and provided with a second electrode, a second orientation film covering the second electrode, and a liquid crystal layer interposed between the first and the second substrates,
a pair of polarizing plates disposed outside the first and second substrates, respectively,
wherein the liquid crystal layer is formed of a mixture of a nematic liquid crystal including a liquid crystal having a smectic phase,
wherein a ratio of the liquid crystal having the smectic phase in the mixture is 20 weight% or less, and
wherein the liquid crystal mixture comprises a nematic phase.

2. A liquid crystal electro-optical device comprising:
a first substrate,
a first electrode over the first substrate,
a first orientation film covering the first electrode, and
a second substrate opposed to the first substrate and provided with a second electrode, a second orientation film covering the second electrode, and a liquid crystal layer interposed between the first and the second substrates,
a pair of polarizing plates disposed outside the first and second substrates, respectively,
wherein the liquid crystal layer is formed of a mixture of a nematic liquid crystal including a liquid crystal having a smectic phase,
wherein a phase transition temperature from an isotropic phase of the liquid crystal having the smectic phase is higher than a phase transition temperature from an isotropic phase of the nematic liquid crystal,
wherein a ratio of the liquid crystal having the smectic phase in the mixture is 20 weight% or less, and
wherein the liquid crystal mixture comprises a nematic phase.

3. A liquid crystal electro-optical device comprising:
a first substrate,
a first electrode over the first substrate,
a first orientation film covering the first electrode, and
a second substrate opposed to the first substrate and provided with a second electrode, a second orientation film covering the second electrode, and a liquid crystal layer interposed between the first and the second substrates,
a pair of polarizing plates disposed outside the first and second substrates, respectively,
wherein the liquid crystal layer is formed of a mixture of a nematic liquid crystal including a liquid crystal having a smectic phase,
wherein a ratio of the liquid crystal having the smectic phase in the mixture is 20 weight % or less, and
wherein the liquid crystal mixture is a nematic phase,
wherein a product of a cell gap and the refractive index anisotropy $\Delta n$ of the nematic liquid crystal is in the range of 0.27 μm or more to 0.34 μm or less.

4. The liquid crystal electro-optical device according to claim 1, wherein the liquid crystal having the smectic phase is a monostable ferroelectric liquid crystal.

5. The liquid crystal electro-optical device according to claim 2, wherein the liquid crystal having the smectic phase is a monostable ferroelectric liquid crystal.

6. The liquid crystal electro-optical device according to claim 3, wherein the liquid crystal having the smectic phase is a monostable ferroelectric liquid crystal.

7. The liquid crystal electro-optical device according to claim 1, wherein the liquid crystal having the smectic phase is a bistable ferroelectric liquid crystal.

8. The liquid crystal electro-optical device according to claim 3, wherein the liquid crystal having the smectic phase is a bistable ferroelectric liquid crystal.

9. The liquid crystal electro-optical device according to claim 1, wherein the liquid crystal having a smectic phase is a monostable ferroelectric liquid crystal, and wherein the rise response time of the plurality of liquid crystal molecules in the mixture is shorter by 4 msec at a maximum than the nematic liquid crystal not including the liquid crystal having the smectic phase.

10. The liquid crystal electro-optical device according to claim 3, wherein the liquid crystal having a smectic phase is a monostable ferroelectric liquid crystal, and wherein the rise response time of the plurality of liquid crystal molecules in the mixture is shorter by 4 msec at a maximum than the nematic liquid crystal not including the liquid crystal having the smectic phase.

11. The liquid crystal electro-optical device according to claim 1, wherein the nematic liquid crystal is added with a chiral agent.

12. The liquid crystal electro-optical device according to claim 2, wherein the nematic liquid crystal is added with a chiral agent.

13. The liquid crystal electro-optical device according to claim 3, wherein the nematic liquid crystal is added with a chiral agent.

14. The liquid crystal electro-optical device according to claim 1, wherein dielectric anisotropy $\Delta\epsilon$ of the nematic liquid crystal is a positive value.

15. The liquid crystal electro-optical device according to claim 2, wherein dielectric anisotropy $\Delta\epsilon$ of the nematic liquid crystal is a positive value.

16. The liquid crystal electro-optical device according to claim 3, wherein dielectric anisotropy $\Delta\epsilon$ of the nematic liquid crystal is a positive value.

17. The liquid crystal electro-optical device according to claim 1, wherein the nematic liquid crystal is a fluorine-based liquid crystal.

18. The liquid crystal electro-optical device according to claim 2, wherein the nematic liquid crystal is a fluorine-based liquid crystal.

19. The liquid crystal electro-optical device according to claim 3, wherein the nematic liquid crystal is a fluorine-based liquid crystal.

20. The liquid crystal electro-optical device according to claim 1, wherein dielectric anisotropy $\Delta\epsilon$ of the nematic liquid crystal is 5 or more to 10 or less at 20° C.

21. The liquid crystal electro-optical device according to claim 2, wherein dielectric anisotropy $\Delta\epsilon$ of the nematic liquid crystal is 5 or more to 10 or less at 20° C.

22. The liquid crystal electro-optical device according to claim 3, wherein dielectric anisotropy Δε of the nematic liquid crystal is 5 or more to 10 or less at 20° C.

23. The liquid crystal electro-optical device according to claim 1, wherein a cell gap is a thickness of a liquid crystal layer held between the first and the second substrates, and wherein the cell gap is 2.0 μm or more to 2.5 μm or less.

24. The liquid crystal electro-optical device according to claim 2, wherein a cell gap is a thickness of a liquid crystal layer held between the first and the second substrates, and wherein the cell gap is 2.0 μm or more to 2.5 μm or less.

25. The liquid crystal electro-optical device according to claim 3, wherein the cell gap is a thickness of a liquid crystal layer held between the first and the second substrates, and wherein the cell gap is 2.0 μm or more to 2.5 μm or less.

26. The liquid crystal electro-optical device according to claim 1, wherein a TN mode is used in the liquid crystal electro-optical device.

27. The liquid crystal electro-optical device according to claim 2, wherein a TN mode is used in the liquid crystal electro-optical device.

28. The liquid crystal electro-optical device according to claim 3, wherein a TN mode is used in the liquid crystal electro-optical device.

29. An electronic device having the liquid crystal electro-optical device as disclosed in claim 1.

30. An electronic device having the liquid crystal electro-optical device as disclosed in claim 2.

31. An electronic device having the liquid crystal electro-optical device as disclosed in claim 3.

32. A mobile phone having the liquid crystal electro-optical device as disclosed in claim 1.

33. A mobile phone having the liquid crystal electro-optical device as disclosed in claim 2.

34. A mobile phone having the liquid crystal electro-optical device as disclosed in claim 3.

35. A television receiver having the liquid crystal electro-optical device as disclosed in claim 1.

36. A television receiver having the liquid crystal electro-optical device as disclosed in claim 2.

37. A television receiver having the liquid crystal electro-optical device as disclosed in claim 3.

38. A projection type display device having the liquid crystal electro-optical device as disclosed in claim 1 in a projector unit.

39. A projection type display device having the liquid crystal electro-optical device as disclosed in claim 2 in a projector unit.

40. A projection type display device having the liquid crystal electro-optical device as disclosed in claim 3 in a projector unit.

* * * * *